United States Patent
Howson et al.

(10) Patent No.: US 12,243,151 B2
(45) Date of Patent: *Mar. 4, 2025

(54) REDUCED ACCELERATION STRUCTURES FOR RAY TRACING SYSTEMS

(71) Applicant: Imagination Technologies Limited, Kings Langley (GB)

(72) Inventors: John W. Howson, St. Albans (GB); Luke T. Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,940

(22) Filed: Oct. 23, 2023

(65) Prior Publication Data

US 2024/0054715 A1 Feb. 15, 2024

Related U.S. Application Data

(60) Division of application No. 16/555,316, filed on Aug. 29, 2019, now abandoned, which is a continuation of
(Continued)

(51) Int. Cl.
*G06T 15/06* (2011.01)
*G06T 15/00* (2011.01)
(Continued)

(52) U.S. Cl.
CPC ............ *G06T 15/06* (2013.01); *G06T 15/005* (2013.01); *G06T 15/20* (2013.01); *G06T 15/30* (2013.01);
(Continued)

(58) Field of Classification Search
None
See application file for complete search history.

(56) References Cited

U.S. PATENT DOCUMENTS

| | | |
|---|---|---|
| 5,704,024 A | 12/1997 | Voorhies et al. |
| 6,765,575 B1 | 7/2004 | Voorhies et al. |
| (Continued) | | |

OTHER PUBLICATIONS

Aila et al., "dPVS: An Occlusion Culling System for Massive Dynamic Environments," IEEE Computer Graphics and Applications, vol. 24, No. 2, Mar. 2004, pp. 86-97.
(Continued)

*Primary Examiner* — Robert Bader
(74) *Attorney, Agent, or Firm* — Potomac Law Group, PLLC; Vincent M DeLuca

(57) ABSTRACT

Ray tracing units, processing modules and methods are described for generating one or more reduced acceleration structures to be used for intersection testing in a ray tracing system for processing a 3D scene. Nodes of the reduced acceleration structure(s) are determined, wherein a reduced acceleration structure represents a subset of the 3D scene. The reduced acceleration structure(s) are stored for use in intersection testing. Since the reduced acceleration structures represent a subset of the scene (rather than the whole scene) the memory usage for storing the acceleration structure is reduced, and the latency in the traversal of the acceleration structure is reduced.

20 Claims, 12 Drawing Sheets

Related U.S. Application Data application No. 15/705,976, filed on Sep. 15, 2017, now Pat. No. 10,438,397.

(51) Int. Cl.

| | | |
|---|---|---|
| *G06T 15/20* | (2011.01) |
| *G06T 15/30* | (2011.01) |
| *G06T 15/40* | (2011.01) |
| *G06T 15/60* | (2006.01) |
| *G06T 17/00* | (2006.01) |

(52) U.S. Cl.
CPC .............. *G06T 15/40* (2013.01); *G06T 15/60* (2013.01); *G06T 17/005* (2013.01); *G06T 2210/21* (2013.01)

(56) References Cited

U.S. PATENT DOCUMENTS

| 8,717,357 | B2 | 5/2014 | McCombe et al. | |
|---|---|---|---|---|
| 2009/0195555 | A1 | 8/2009 | Nystad et al. | |
| 2010/0188403 | A1 | 7/2010 | Mejdrich et al. | |
| 2010/0239185 | A1 | 9/2010 | Fowler et al. | |
| 2014/0063016 | A1* | 3/2014 | Howson .................. | G06T 15/06 345/426 |
| 2015/0228109 | A1* | 8/2015 | Zimmerman ........... | G06T 15/06 345/419 |
| 2015/0317818 | A1 | 11/2015 | Howson et al. | |

OTHER PUBLICATIONS

Ernst et al., "Multi-Bounding Volume Hierarchies," IEEE Symposium on Interactive Ray Tracing 2008, Aug. 9, 2008, pp. 35-40.

Hunt et al., "Adaptive Acceleration Structures in Perspective Space," IEEE/EG Symposium on Interactive Ray Tracing, Aug. 9-10, 2008, pp. 11-17.

Hunt et al., "Ray-Specialized Acceleration Structures for Ray Tracing," IEEE/EG Symposium on Interactive Ray Tracing, Aug. 9-10, 2008, pp. 3-10.

Kang et al., "gkDtree: A Group-based Parallel Update kd-tree for Interactive Ray Tracing," Journal of Systems Architecture, vol. 59, No. 3, Jul. 2011, p. 168.

Moeller et al., "Real-time Rendering," 3rd Edition, 2008, A.K. Peters Natick MA 01760, Chapter 14.

Parker et al., "OptiX: A General Purpose Ray Tracing Engine," ACM Transactions on Graphics, vol. 29, No. 4, Article 66, Jul. 2010.

Purcell et al., "Ray Tracing on Programmable Graphics Hardware," Association for Computing Machinery, Inc. 2002, pp. 703-712.

Teller et al., "Frustum Casting for Progressive, Interactive Rendering," MIT Laboratory for Computer Science, Jan. 31, 1998, sections 2.4 and 3.1.

Wong et al., "GPU Ray Tracing Based on Reduced Bounding Volume Hierarchies," 2012 Ninth International Conference on Computer Graphics, Imaging and Visualization, IEEE 2012, pp. 1-6.

Aliaga et al., "MMR: An Interactive Massive Model Rendering System using Geometric and Image-Based Acceleration," Proceedings of the 1999 Symposium on Interactive 3D Graphics, ACM 1999, pp. 199-206.

Hunt, "Data Structures and Algorithms for Real-Time Ray Tracing at the University of Texas at Austin," Dissertation, Dec. 2008.

Greene, "Environment Mapping and Other Applications of World Projections," IEEE Graphics and Applications, vol. 8, No. 11, Nov. 1986.

\* cited by examiner

REDUCED ACCELERATION STRUCTURES FOR RAY TRACING SYSTEMS

CROSS-REFERENCE TO RELATED APPLICATIONS AND CLAIM OF PRIORITY

This application is a division under 35 U.S.C. 121 of application Ser. No. 16/555,316 filed Aug. 29, 2019, which is a continuation of prior application Ser. No. 15/705,976 filed Sep. 15, 2017, now U.S. Pat. No. 10,438,397. This application is also related to prior application Ser. No. 16/555,411 filed Aug. 29, 2019, now U.S. Pat. No. 11,062,501, the contents of which are incorporated by reference herein in their entireties.

BACKGROUND

Ray tracing systems can simulate the manner in which rays (e.g. rays of light) interact with a scene. For example, ray tracing techniques can be used in graphics rendering systems which are configured to produce images from 3-D scene descriptions. The images can be photorealistic, or achieve other objectives. For example, animated movies can be produced using 3-D rendering techniques. The description of a 3D scene typically comprises data defining geometry in the scene. This geometry data is typically defined in terms of primitives, which are often triangular primitives, but can sometimes be other shapes such as other polygons, lines or points.

Ray tracing can mimic the natural interaction of light with objects in a scene, and sophisticated rendering features can naturally arise from ray tracing a 3-D scene. Ray tracing can be parallelized relatively easily on a pixel by pixel level because pixels generally are independent of each other. However, it is difficult to pipeline the processing involved in ray tracing because of the distributed and disparate positions and directions of travel of the rays in the 3-D scene, in situations such as 30 ambient occlusion, reflections, caustics, and so on. Ray tracing allows for realistic images to be rendered but often requires high levels of processing power and large working memories, such that ray tracing can be difficult to implement for rendering images in real-time (e.g. for use with gaming applications), particularly on devices which may have tight constraints on silicon area, cost and power consumption, such as on mobile devices (e.g. smart phones, tablets, laptops, etc.).

At a very broad level, ray tracing involves: (i) identifying intersections between rays and geometry (e.g. primitives) in the scene, and (ii) performing some processing (e.g. by executing a shader program) in response to identifying an intersection to determine how the intersection contributes to the image being rendered. The execution of a shader program may cause further rays to be emitted into the scene. These further rays may be referred to as "secondary rays", and may include occlusion rays for determining shadow effects, or reflection rays for determining reflections in the scene. Rays are traced from an origin and intersections of the rays with geometry in the scene can be determined. FIG. 1 shows an example of a scene 102 which includes two surfaces $104_1$ and $104_2$. This is a very simple example, and in other examples there would likely be many more surfaces and objects within the scene. FIG. 1 shows two light sources $106_1$ and $106_2$ which illuminate objects in the scene. The viewpoint from which the scene is viewed is shown at 108 and the view plane of the frame to be rendered is represented at 110.

Identifying intersections between rays and geometry in the scene involves a large processing workload. In a very naïve approach, every ray could be tested against every primitive in a scene and then when all of the intersection hits have been determined, the closest of the intersections could be identified for each ray. This approach is not feasible to implement for scenes which may have millions or billions of primitives, where the number of rays to be processed may also be millions. So, ray tracing systems typically use an acceleration structure which characterises the geometry in the scene in a manner which can reduce the workload of intersection testing. Acceleration structures can have a hierarchical structure such that there are multiple levels of nodes within an acceleration structure. The term "hierarchy" may be used herein to refer to a hierarchical acceleration structure. To give some examples, a hierarchical acceleration structure may have a grid structure, an octree structure, a space partitioning structure (e.g. a k-d tree), or a bounding volume structure.

An octree structure (which is an example of a spatial subdivision structure) recursively subdivides 3D space by halving a node in each of three spatial directions (e.g. along x, y and z axes) thereby subdividing a node into eight equal regions, which are represented as child nodes in the hierarchy. FIG. 2a represents a corresponding two dimensional example (i.e. a quadtree) in which a node is halved in both x and y directions, depending on the complexity of the content (e.g. the number of primitives) within the nodes. FIG. 2a illustrates a scene 200 which includes three objects 202, 204 and 206. FIG. 2b represents the nodes of the hierarchical acceleration structure representing the regions shown in FIG. 2a. The acceleration structure shown in FIGS. 2a and 2b has a top level node 210 which covers the whole scene 200. The node 210 is subdivided into four quarters, represented by the nodes $212_1$ to $212_4$. The node $212_1$ represents the top left quarter of the node 210 and is not further subdivided. The node $212_1$ includes a reference to the object 204. The node $212_2$ represents the top right quarter of the node 210 and is not further subdivided. The node $212_2$ includes a reference to the object 202. The node $212_4$ represents the bottom right quarter of the node 210 and is empty and not further subdivided. The node $212_3$ represents the bottom left quarter of the node 210 which covers both of the objects 204 and 206. Node $212_3$ is subdivided into four quarters $214_1$ to $214_4$. The node $214_1$ represents the top left quarter of the node $212_3$ and is not further subdivided. The node $214_1$ includes references to the objects 204 and 206. The node $214_2$ represents the top right quarter of the node $212_3$ and is empty and not further subdivided. The node $214_3$ represents the bottom left quarter of the node $212_3$ and is not further subdivided. The node $214_3$ includes a reference to the object 206. The node $214_4$ represents the bottom right quarter of the node $212_3$ and is not further subdivided. The node $214_4$ includes a reference to the object 206.

The empty nodes (e.g. $212_4$ and $214_2$) can either be excluded entirely from the hierarchy or they can be included in the hierarchy but marked as "empty" so that no intersection testing is performed on the empty nodes. The encoding format determines which of these two options is more suitable. In both cases, conceptually, the empty nodes can be considered to be excluded because the traversal of the hierarchy during intersection testing will not include testing of the empty nodes.

Spatial subdivision structures (e.g. the octree structure of FIGS. 2a and 2b) divide the space of a scene into regions and form nodes of a hierarchical acceleration structure to represent those regions of the scene. In contrast, a bounding volume structure has nodes corresponding to volumetric elements which are positioned based on the content of the scene. FIGS. 3a and 3b relate to a hierarchy having a bounding volume structure. FIG. 3a illustrates a scene 300 which includes three objects 302, 304 and 306. FIG. 3b shows nodes of a hierarchical acceleration structure wherein the root node 310 represents the whole scene 300. Regions in the scene shown in FIG. 3a have references matching those of the corresponding nodes in the hierarchy shown in FIG. 3b, but the references for the regions in FIG. 3a include an additional prime symbol ('). The objects in the scene are analysed in order to build the hierarchy, and two nodes $312_1$ and $312_2$ are defined descended from the node 310 which bound regions containing objects. In this example, the nodes in the bounding volume hierarchy represent axis-aligned bounding boxes (AABBs) but in other examples the nodes could represent regions which take other forms, e.g. spheres or other simple shapes. The node $312_1$ represents a box $312_1'$ which covers the objects 304 and 306. The node $312_2$ represents a box $312_2'$ which covers the object 302. The node $312_1$ is subdivided into two nodes $314_1$ and $314_2$ which represent AABBs ($314_1'$ and $314_2'$) which respectively bound the objects 304 and 306. Methods for determining the AABBs for building nodes of a hierarchy are known in the art, and may be performed in a top-down manner (e.g. starting at the root node and working down the hierarchy), or may be performed in a bottom-up manner (e.g. starting at the leaf nodes and working up the hierarchy). In the example shown in FIGS. 3a and 3b, objects do not span more than one leaf node, but in other examples objects may span more than one leaf node.

When traversing a hierarchical acceleration structure for intersection testing of a ray in a scene, the ray is initially tested against the root node. If an intersection is found between the ray and a node then the ray may be tested for intersection with one or more nodes which are children of the intersected node. There are a number of different traversal techniques which can be used to traverse a hierarchical acceleration structure, such as a depth-first traversal technique and a breadth-first traversal technique. In a depth-first traversal technique a subset of the children of an intersected node (e.g. a single child of the intersected node) may be tested for intersection before optionally testing other children of the intersected node for intersection, depending on the results of the previous intersection testing. In contrast, according to a breadth-first traversal technique, if an intersection is found between a ray and a node then the ray may be tested for intersection with all of the nodes which are children of the intersected node prior to performing the intersection testing for any of those children.

With current state of the art acceleration structures it is difficult to perform the processes involved in ray tracing (e.g. build an acceleration structure, perform intersection testing and execute shader programs in dependence on the results of the intersection testing) at a rate that is suitable for rendering images in real-time (e.g. for use with gaming applications), particularly on devices which have tight constraints on silicon area, cost and power consumption, such as on mobile devices (e.g. smart phones, tablets, laptops, etc.). Furthermore, the acceleration structures need to be stored, e.g. in a memory, and this can involve storing lots of data, which increases the memory requirements of the system and also means that large amounts of data are transferred between a memory and a chip on which a ray tracing system is implemented. The transfer of large amounts of data (i.e. a high memory bandwidth) typically corresponds to high latency and power consumption of the ray tracing system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In embodiments described herein a reduced acceleration structure is generated which represents a subset of the 3D scene. A subset of the 3D scene includes some, but not all, of the 3D scene. In this way the reduced acceleration structure is smaller (e.g. in terms of the number of nodes in the acceleration structure, and/or in terms of the amount of data used to represent the acceleration structure) than an acceleration structure which represents the whole 3D scene (which may be referred to as a "world space acceleration structure"). A reduction in the number of nodes included in an acceleration structure reduces the amount of processing performed when traversing the acceleration structure for the purposes of intersection testing. Furthermore, a reduction in the amount of data used to represent an acceleration structure reduces the amount of data that is stored in a memory to represent the acceleration structure and reduces the amount of data is transferred between the memory and a chip on which a ray tracing system is implemented, thereby reducing the latency and power consumption of the ray tracing system.

In particular, there is provided a computer-implemented method of generating one or more reduced acceleration structures to be used for intersection testing in a ray tracing system for processing (e.g. rendering) a 3D scene, the method comprising: determining nodes of the one or more reduced acceleration structures, wherein each of the one or more reduced acceleration structures represents a respective subset of the 3D scene; and storing the one or more reduced acceleration structures for use in intersection testing.

Each of the one or more reduced acceleration structures may represent a respective subset of primitives in the 3D scene. Each of the one or more reduced acceleration structures may represent a respective sub-region (e.g. a region of interest) within the 3D scene. For example, a region of interest may correspond to a view region, e.g. a view frustum, within the scene. A region of interest for a frame may be determined based on the viewpoint from which the scene is to be rendered for the frame. The nodes of at least one of the reduced acceleration structures may be defined in a view space or a clip space. In this way, a reduced acceleration structure may represent geometry of the scene defined in a view space or clip space. In some examples, an indication of the view space may be received via an API.

There may be provided a computer-implemented method of generating a reduced acceleration structure to be used for intersection testing in a ray tracing system for rendering primitives in a 3D scene, the method comprising: determining nodes of the reduced acceleration structure, wherein the reduced acceleration structure represents a subset of the primitives in the 3D scene; and storing the reduced acceleration structure for use in intersection testing.

There is provided a processing module configured to generate one or more reduced acceleration structures to be used for intersection testing in a ray tracing system for processing a 3D scene, the processing module comprising: acceleration structure building logic configured to determine nodes of the one or more reduced acceleration structures, wherein each of the one or more reduced acceleration structures represents a respective subset of the 3D scene;

wherein the processing module is configured to cause the one or more reduced acceleration structures to be stored for use in intersection testing. Furthermore, there may be provided a ray tracing unit for processing a 3D scene comprising: a processing module as described herein; and intersection testing logic configured to perform intersection testing by traversing the one or more reduced acceleration structures.

There may be provided a vertex processing pipeline (e.g. for use in a ray tracing system) for use in processing (e.g. rendering) a scene from a viewpoint, wherein the vertex processing pipeline is configured to: receive geometry for the scene; process the received geometry to determine relevant geometry by performing one or both of clipping and culling on the received geometry based on the viewpoint; and build a reduced acceleration structure from the determined relevant geometry (e.g. the geometry that was not culled). For example, geometry that is out of bounds when the scene is viewed from the viewpoint may be clipped and culled so that only geometry which is present within the view of the scene from the viewpoint is maintained and included in the reduced acceleration structure. In some examples primitives might not be clipped, but primitives are culled if they are totally outside the relevant sub-region of the scene (e.g. the view frustum within the scene corresponding to the view of the scene as viewed from the viewpoint) for which the reduced acceleration structure is being built. Furthermore, in some examples, backface culling can be implemented such that backfacing primitives are culled.

The ray tracing units and processing modules described herein may be embodied in hardware on an integrated circuit. There may be provided a method of manufacturing, at an integrated circuit manufacturing system, a ray tracing unit or a processing module as described herein. There may be provided an integrated circuit definition dataset that, when processed in an integrated circuit manufacturing system, configures the system to manufacture a ray tracing unit or a processing module as described herein. There may be provided a non-transitory computer readable storage medium having stored thereon a computer readable description of an integrated circuit that, when processed, causes a layout processing system to generate a circuit layout description used in an integrated circuit manufacturing system to manufacture a ray tracing unit or a processing module as described herein.

There may be provided an integrated circuit manufacturing system comprising: a non-transitory computer readable storage medium having stored thereon a computer readable integrated circuit description that describes a ray tracing unit or a processing module as described herein; a layout processing system configured to process the integrated circuit description so as to generate a circuit layout description of an integrated circuit embodying the ray tracing unit or the processing module; and an integrated circuit generation system configured to manufacture the ray tracing unit or the processing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 2b represents a hierarchical acceleration structure for the quadtree structure shown in FIG. 2a;

FIG. 3b represents a hierarchical acceleration structure for the bounding volume structure shown in FIG. 3a;

FIG. 9b illustrates volumetric elements within a scene corresponding to the nodes of the world space hierarchy shown in FIG. 9a;

FIG. 9c illustrates nodes of a reduced acceleration structure corresponding to a subset of the world space hierarchy shown in FIG. 9a;

Figure 1:
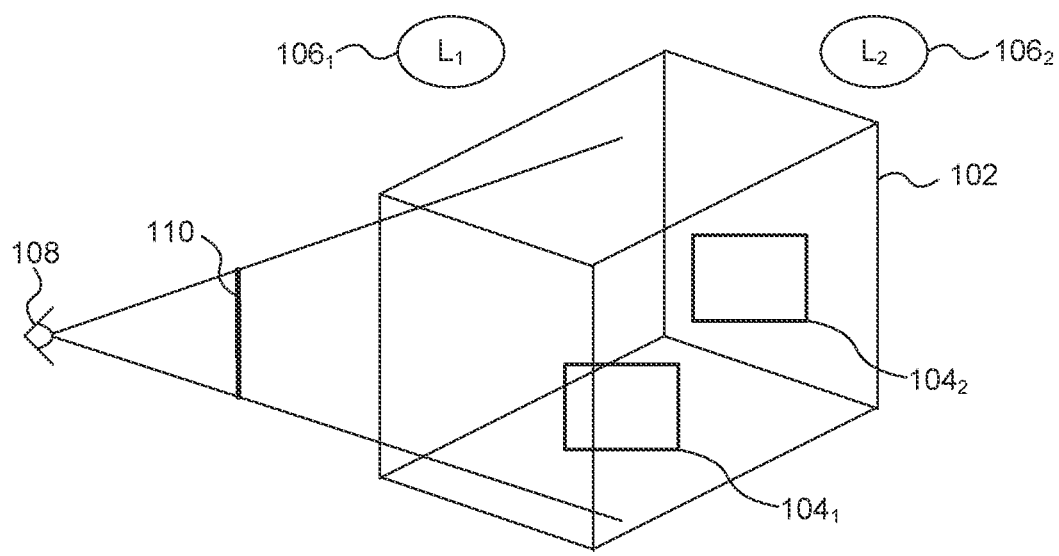
FIG. 1 shows an example scene to be rendered from a viewpoint.
Figure 2A:
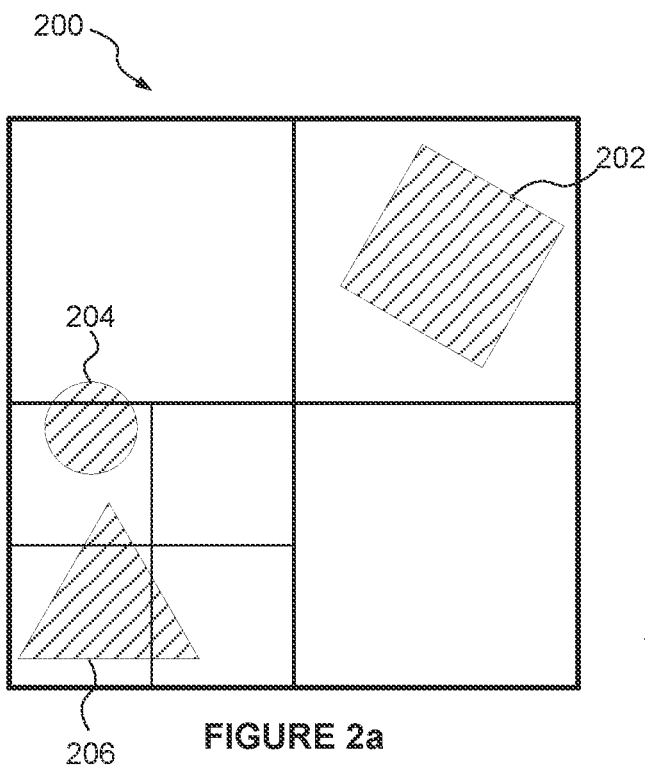
FIG. 2a shows a scene divided according to a quadtree structure.
Figure 2B:
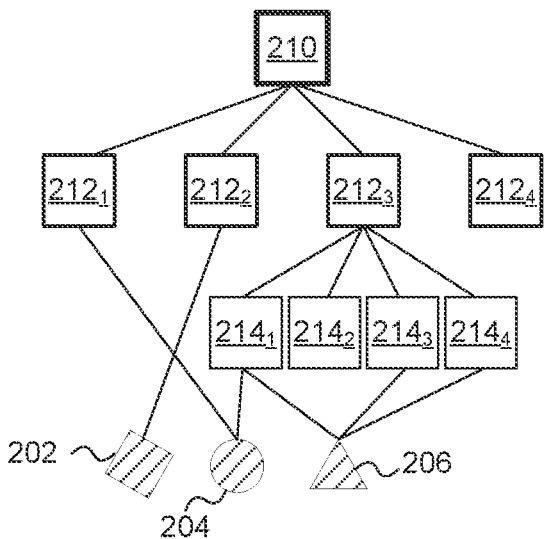

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Objects in a scene to be rendered can be described with reference to a number of different "spaces", and transformations can be performed to convert the coordinates of objects into different spaces. In many raster pipelines, objects are initially described in "object space" (or "local space"), which is a unique coordinate system for each object, where the coordinates of an object are defined relative to its local origin. In this way, different objects may be described with reference to different object spaces. The objects can then be transformed into "world space", which is a unified coordinate system for all objects, where the coordinates of the objects are defined relative to a global origin. In this way, the relative positions of the different objects in a scene can be described in the world space. A viewpoint from which the scene is to be rendered can be defined, and the objects in the scene can be transformed from world space into "view space" (or "eye space"), which is a coordinate system around the viewer with certain conventions, such that the coordinates are defined from the viewer's point of view. For example, in some examples, the coordinates of the objects in view space can be defined according to axes whereby +x is to the viewer's right, +y is downwards from the viewer's perspective, and +z is away from the viewer. In other examples, the axes may be defined differently, but the idea of "view space" means that the coordinate system is defined relative to the viewer, e.g. the coordinates in view space have been transformed and adjusted for the viewer's position and orientation.

The scene, defined in view space, can then be projected into "clip space", producing 4 dimensional points (x,y,z,w) for each of the vertices of the objects. In this way, any coordinates (in view space) that fall outside of an expected range (e.g. an expected range (−1000, +1000)) are clipped (e.g. discarded). These 4D points are divided by the 'w' component to produce 3 dimensional points (x, y, depth) in "normalized device coordinates", e.g. which have values in the range (−1.0, +1.0). Then the coordinates can be transformed into "screen space", in which each point is defined by a two dimensional position (defined by x and y coordinates) with corresponding depth (z buffer) values. The transformation into screen space can be performed by dividing the x and y components of the normalised device coordinates by 2, adding 0.5 (such that the values lie in the range (0, 1), and the x,y origin is moved to the screen corner rather than the screen centre), and scaling the x and y components by the screen resolution to produce the 2D "screen space" x and y coordinates on the screen. The depth values (in the z buffer) are not changed between the normalised device coordinates and the screen space coordinates.

Transformations of coordinates from one space to another space can be performed by multiplying the coordinates by a transformation matrix. In the simple example described above, coordinates are transformed: (i) from object space to world space, (ii) from world space to view space, (iii) from view space to clip space, (iv) from clip space to normalised device coordinates, and (v) from normalised device coordinates to screen space. However, in some examples, two or more of the transformations described above, may be implemented as a single step, with the multiplication of a single transformation matrix. For example, the transformations to go from object space to clip space (i.e. the transformations (i) to (iii) described above) can be collapsed into a single matrix multiply operation, so data might never actually exist in world space or view space in a raster pipeline.

In previous ray tracing systems, a world space acceleration structure representing the geometry in an entire scene is fully traversed to determine the closest intersection of a ray with an object in the scene. In examples herein, information about the rays to be traced (e.g. the origin or destination of a ray, which can for example be determined based on the viewpoint from which the scene is to be rendered) is used to increase the efficiency with which a ray tracing system processes the rays. For example, a reduced hierarchy can be generated which includes geometry within a sub-region or region of interest of a larger world space (e.g. geometry which has been transformed into view space or clip space), and which does not include geometry which is not at least partially within the sub-region or region of interest. For example, the world space may describe a building through which a character can move in a game application, whereas the sub-region might correspond to a room within the building (or other visible sub-region within the building) in which the character is currently located. It is likely that a ray's closest intersection in the scene will be with geometry located inside the sub-region corresponding to a frustum within the scene which is viewable from the viewer's viewpoint. As such it is likely that traversing a reduced hierarchy corresponding to the geometry within the sub-region will be sufficient to find the closest intersection for the ray with geometry in the scene. This is particularly likely for primary rays, but may be slightly less likely for secondary rays. If a ray does not find an intersection within the reduced acceleration structure, then the ray may, or may not, be emitted into a different acceleration structure, e.g. a world space acceleration structure which represents the whole scene. The precision of the data stored for geometry in the world space acceleration structure may be lower than the precision of the data stored for geometry in the reduced acceleration structure(s).

In some examples the ray tracing system may be implemented as part of a tile-based rendering system, and a respective reduced acceleration structure may be generated for each of a plurality of tiles of a rendering space in the tile-based rendering system. In this way, the reduced acceleration structure for a tile represents the geometry of the scene that can be seen within the tile of the rendering space. Therefore, rays that are processed for the tile can be tested for intersection within the reduced acceleration structure corresponding to that tile. This greatly reduces the number of intersection tests that need to be performed on a ray (compared to traversing a world space hierarchy). When processing a primary ray within a tile-based rendering system, the system can identify the tile for which the primary ray is traced simply based on the attributes of the ray (e.g. ray origin and ray direction) because the position of the tiles in the rendering space is known without needing to perform any specific processing. Therefore it is simple to select the correct per-tile reduced acceleration structure to be traversed for intersection testing of a primary ray. The per-tile reduced acceleration structures are useful for primary rays, but secondary rays may travel outside of the sub-region of the scene corresponding to the reduced acceleration structure before any intersections are found, so secondary rays may be emitted into a further acceleration structure (e.g. a view space hierarchy or a world space hierarchy) to find intersections for the secondary rays. A view space hierarchy may represent a view frustum within the scene for the view of the scene being rendered. However, a view space hierarchy may, more generally, represent a volume of interest (e.g. a room in which a character is located, even if the whole of the room is not within the view frustum).

In examples described herein, one or more reduced acceleration structures are built for a specific function (e.g. viewing a particular sub-region of a scene, or for determining shadows from a particular light source). The reduced acceleration structures may have a structure which is optimized for the specific function. In other words, separate use-case-optimized acceleration structures may be generated. A reduced acceleration structure may be optimized in terms of reducing the amount of data used to store the acceleration structure and/or in terms of reducing the processing required to traverse the acceleration structure during intersection testing. There is a trade off between optimizing the reduced acceleration structure (e.g. by reducing the size of a sub-region within the scene which is represented by the reduced acceleration structure), and reducing the number of times that a ray, which is tested against the reduced acceleration structure for intersection testing, does not find an intersection in the reduced acceleration structure (e.g. by increasing the size of the sub-region within the scene which is represented by the reduced acceleration structure). As described herein, when a ray does not find an intersection in the reduced acceleration structure, the ray may be emitted into a further acceleration structure; or alternatively the ray might not re-emitted and the consequences (e.g. rendering artefacts or default shader behaviour) of the rays missing geometry in the reduced acceleration structure can be tolerated. Therefore, based on the use to which a reduced acceleration structure is to be put, the reduced acceleration structure represents a subset of the scene for which an intersection is likely to be found, but does not represent parts of the scene for which an intersection is unlikely to be found.

In some examples, a vertex processing pipeline has a view space defined, and is able to clip and/or cull geometry based on that view space, before building a hierarchy from the geometry that wasn't culled. This may include clipping geometry that is out of bounds. However, it may not be necessary or even efficient to clip triangles, such that in some examples triangles are not clipped, but triangles can be culled if they are totally outside the sub-region of the scene (e.g. the view frustum) for which the hierarchy is being built. Furthermore, in some examples, the orientation of primitives can be taken into account when deciding whether to cull primitives. In this way, backface culling can be implemented whereby single-sided triangles (or "primitives") that are not facing the viewer may be culled such that they are not included in the hierarchy.

Using reduced acceleration structures as described herein can increase the efficiency of the intersection testing performed by a ray tracing system, and can decrease the memory storage requirements for storing the acceleration structure(s), and can decrease the amount of data that is transferred between a ray tracing unit and a memory, thereby decreasing latency and power consumption of the ray tracing system.

Figure 4:
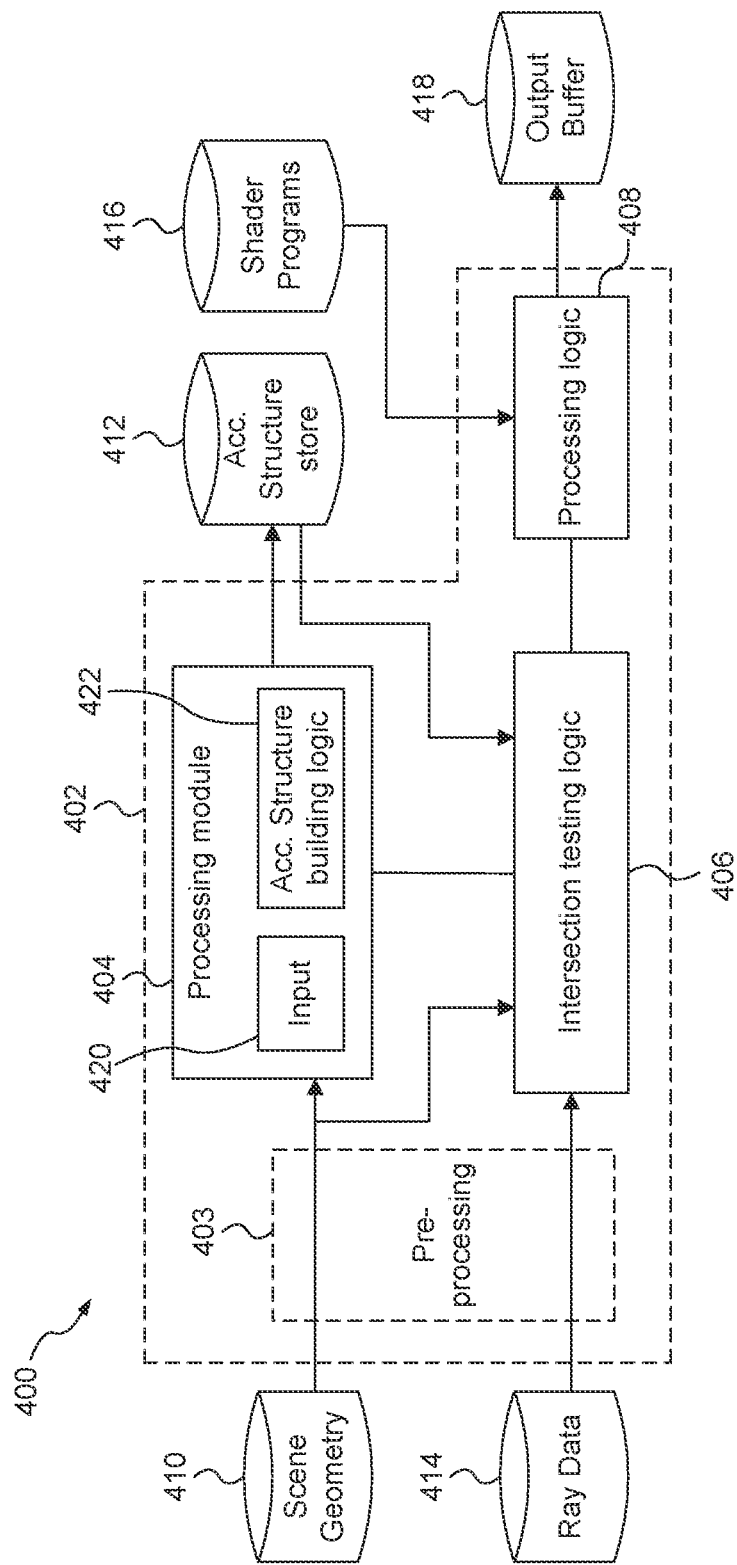
FIG. 4 illustrates a ray tracing system.

FIG. 4 illustrates a ray tracing system 400 which is configured to render an image of a 3D scene. The ray tracing system 400 comprises a ray tracing unit 402 which is configured to perform intersection testing and to execute shader programs in response to identifying intersections. The ray tracing unit 402 comprises a processing module 404 which is configured to generate a hierarchical acceleration structure to be used for intersection testing in the ray tracing system 400. The ray tracing unit 402 also comprises pre-processing logic 403, intersection testing logic 406 and processing logic 408. The ray tracing system 400 also comprises a number of different stores (410 to 418) which are coupled to the ray tracing unit 402. FIG. 4 shows the stores (410 to 418) being implemented outside of the ray tracing unit 402 and coupled thereto, but in some examples one or more of the stores (410 to 418) may be implemented as part of the ray tracing unit 402. In particular, the ray tracing system 400 comprises a scene geometry data store 410, an acceleration structure store 412, a ray data store 414, a shader program store 416 and an output buffer 418.

The scene geometry data store 410 is configured to store data defining the geometry in the scene to be rendered. The ray tracing unit 402 is coupled to the scene geometry data store 410 and configured to receive the data defining the geometry in the scene (e.g. in the form of primitives describing objects in the scene). The pre-processing logic 403 is an optional component of the ray tracing unit 402, which is why it is shown with dashed lines in FIG. 4. In some examples, the pre-processing logic 403 is present within the ray tracing unit 402 and the geometry data (representing the primitives in the 3D scene to be rendered) provided from the scene geometry data store 410 to the pre-processing logic 403 has not yet been transformed into view space (or clip space), e.g. the geometry data may be in object space or world space. In these examples, the pre-processing logic 403 is configured to perform pre-processing on the primitives in the 3D scene, where the pre-processing may include one or both of clipping and transforming the primitives. The pre-processed (e.g. clipped and transformed) primitives are output from the pre-processing logic 403 and provided to the processing module 404 and to the intersection testing logic 406. However, in some other examples, vertex processing may be performed (e.g. by executing a vertex shader program on a processing unit) prior to the vertex data being received at the ray tracing unit 402. For example, a vertex transformation pipeline may process vertices of primitives to transform the vertices into view space or clip space, and the transformed vertex data may be stored in the scene geometry data store 410. Therefore, when the geometry data is received from the scene geometry data store 410, it is already defined in view space (or clip space) coordinates. The view space (or clip space) vertices can be fed into the processing module 404 in order to build an acceleration structure, without the need for any pre-processing to be performed in the ray tracing unit 402. Therefore, in these examples, the pre-processing logic 403 is not present within the ray tracing unit 402 and the geometry data output from the scene geometry data store 410 is provided to the processing module 404 and to the intersection testing logic 406. The processing module 404 comprises an input 420 and acceleration structure building logic 422, and is configured to use the geometry data it receives to generate one or more hierarchical acceleration structures describing geometry within the scene. The acceleration structure building logic 422 may be implemented in software executing on general purpose processing hardware, or may be implemented in hardware, e.g. in fixed-function circuitry, physically configured to implement the functions of the acceleration structure building logic 422 as described herein. The generation of the hierarchical acceleration structure(s) is described below with reference to FIG. 5, and includes generating at least one reduced acceleration structure. The hierarchical acceleration structure(s) provided by the processing module 404 is(are) passed to, and stored in, the acceleration structure store 412.

The intersection testing logic 406 is configured to access the hierarchical acceleration structure(s) stored in the store 412. The intersection testing logic 406 is further arranged to receive the scene geometry data (which may or may not have been processed by the pre-processing logic 403) and to receive ray data defining rays to be traversed through the acceleration structure. If the pre-processing logic 403 is present in the ray tracing unit 402 then the pre-processing logic 403 can transform the rays into the same space that the scene geometry has been transformed into (e.g. view space or clip space). If the pre-processing logic 403 is not present in the ray tracing unit 402 then the ray tracing unit 402 can assume that both the geometry and the rays that are received at the ray tracing unit 402 are defined in the same space (e.g. view space or clip space), so that intersection testing can be performed correctly. The intersection testing logic 506 comprises one or more execution units for performing the intersection testing, which may be implemented in fixed-function hardware, e.g. dedicated circuitry. The intersection testing logic 406 is configured to perform intersection testing by traversing the hierarchical acceleration structure(s) as described below with reference to FIG. 6.

In the examples described in the preceding two paragraphs, the processing module 404 receives transformed geometry data, i.e. geometry data which is already defined in view space (or clip space) coordinates. In other examples, the processing module 404 may receive untransformed geometry data, and the processing module 404 (e.g. the acceleration structure building logic 422) is configured to transform the vertices of the geometry data into view space or clip space, and then to build an acceleration structure for the transformed geometry data. In these other examples, the pre-processing logic 403 is not needed, and there is no need to transform the geometry data into view space prior to the geometry data being received at the ray tracing unit 402.

Results of the intersection testing are passed to the processing logic 408. The processing logic 408 comprises one or more execution units and is configured to use results of the traversal of the acceleration structure(s) for rendering an image of the 3D scene. In particular, the processing logic 408 can execute shader programs (e.g. software programs which have been received from the shader program store 416) in response to an indication of an intersection between a ray and a primitive in the scene. The execution of a shader program at the processing logic 408 may result in the emission of one or more rays (which may be referred to as "secondary rays") which can be passed back to the intersection testing logic 406 for intersection testing. The execution of a shader program at the processing logic 408 may also determine an image value (e.g. a pixel value) which can be stored in the output buffer 418. The output buffer 418 (which may be referred to as a frame buffer) may store pixel values of an image being rendered by the ray tracing system 400.

Figure 5:
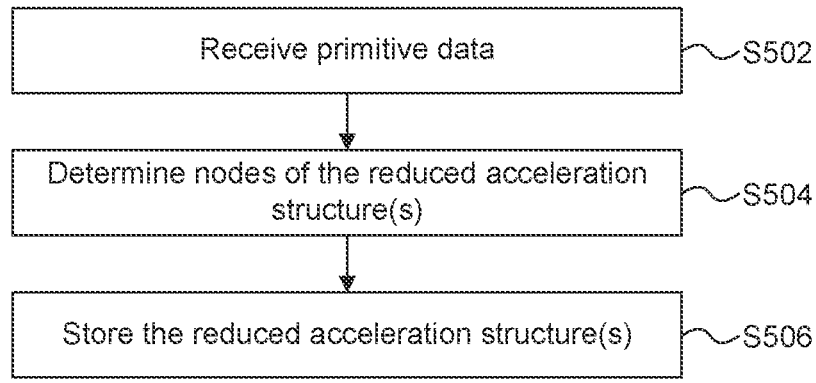
FIG. 5 is a flow chart for a method of generating a reduced acceleration structure.

FIG. 5 is a flow chart for a method of generating a reduced acceleration structure to be used for intersection testing in the ray tracing system 400. In step S502 primitive data for primitives located in a 3D scene to be rendered is received at the input 420 of the processing module 404. In the example shown in FIG. 4 the primitive data (or "geometry data") may be received from the pre-processing logic 403 and may be defined in view space or clip space). Therefore, in some examples, pre-processing is performed by the pre-processing logic 403 on primitives in the 3D scene prior to determining nodes of one or more reduced acceleration structures.

In some examples, it is possible that the primitive data received from the scene geometry data store 410 has not been transformed into view space or clip space. For example, the received geometry data for objects may be defined in respective object spaces. Respective acceleration structures may be determined for different ones, or groups, of the objects. The different acceleration structures can be merged to create one or more compound acceleration structures. This can expedite the acceleration structure building process from frame to frame, whereby an acceleration structure built for a previous frame (e.g. representing static geometry in the scene) can be used as an input to the acceleration structure building process for a current frame. Acceleration structures for dynamic objects can be merged with the acceleration structure for the static geometry from the previous frame in order to generate a merged acceleration structure for the current frame. As the view point changes from frame to frame, individual object-space acceleration structures can be re-transformed by the acceleration structure building logic 422 into the appropriate view space for each frame. An explanation of the way in which separate acceleration structures can be merged together can be found in U.S. patent application Ser. No. 15/464,729.

In general, the acceleration structure building logic 422 is configured to build a generic data structure that references the primitives. This data structure may be a simple list of primitives (e.g. in a parameter buffer). However, in some examples, the acceleration structure building logic 422 is configured to construct a richer index structure that goes beyond a simple list of primitives. In these examples, the acceleration structure building logic 422 may create a more advanced acceleration structure, such as a bounding volume hierarchy (BVH), depth sorted bins, a kd tree, or an oct tree, etc.

In step S504 the acceleration structure building logic 422 determines the nodes of one or more reduced acceleration structures for the scene. This can be done in a number of different ways in different examples, as described below. The nodes of an acceleration structure represent volumetric elements within the 3D scene. One or more reduced acceleration structures are built, wherein each of the one or more reduced acceleration structures represents a respective subset of the 3D scene. The acceleration structures may have a bounding volume structure and/or a spatial subdivision structure. Methods for analysing the primitives within a scene to determine nodes of an acceleration structure are known in the art. For example, methods for analysing the primitives within a scene to determine nodes of an acceleration structure according to a bounding volume structure are described in U.S. Pat. No. 8,717,357. For example, the acceleration structure building logic 422 may identify which primitives are present within volumetric elements within the 3D scene. The logic 422 may determine primitive indications for leaf nodes of the hierarchical acceleration structure to indicate primitives which are present within the volumetric elements corresponding to the respective leaf nodes.

A reduced acceleration structure is "reduced" in the sense that it does not represent the whole 3D scene, and instead represents just a subset of the 3D scene, e.g. a subset of the primitives in the 3D scene. Therefore the "subset" can be considered to be a "proper subset". The 3D scene is represented by the geometry data that the application submits to the rendering system for rendering. A reduced acceleration structure may be generated by culling nodes from a larger acceleration structure (e.g. by culling nodes from a world space acceleration structure representing the entire 3D scene), but in some examples a reduced acceleration structure may be generated without reference to a larger acceleration structure (i.e. without an active step of "reducing" a larger, superset hierarchy). Indeed, in some examples, a larger acceleration structure (such as a whole scene hierarchy) does not exist. For example, a client or game engine could manage the reduced hierarchies without a set of geometry that would compose the larger hierarchy ever existing in any concrete form. For example, subsets of geometry for subsets of the scene can be paged from memory or even generated on the fly. A reduced acceleration structure may be optimised for a specific function. For example, a reduced acceleration structure may be optimised for a specific view direction such that it represents geometry within a view region, e.g. a view frustum, of the 3D scene for use in intersection testing of rays against geometry within the view region.

As another example, a reduced acceleration structure may be optimised for a specific ray direction such that it represents geometry which can be viewed from a particular ray direction for use in determining shadow effects caused by a light source which is situated along the particular ray direction. For example, a respective reduced acceleration structure may be generated for each of one or more light sources for the 3D scene, wherein the reduced acceleration structure for a light source represents primitives within a sub-region of the scene which can cast shadows from the light source onto primitives to be rendered within a view space of the 3D scene.

When the one or more reduced acceleration structures have been built, in step S506 the reduced acceleration structure(s) is(are) stored in the acceleration structure store 412 for subsequent use in intersection testing. In particular, the processing module 404 sends the reduced acceleration structure(s) to the store 412 for storage therein. As mentioned previously, although the acceleration structure store 412 is shown in FIG. 4 as being outside of the ray tracing unit 402 (e.g. the store 412 may be implemented in system memory and coupled to the ray tracing unit 402 via a system bus), in some examples the acceleration structure store 412 may be implemented as part of the ray tracing unit 402, e.g. on chip.

Figure 7:
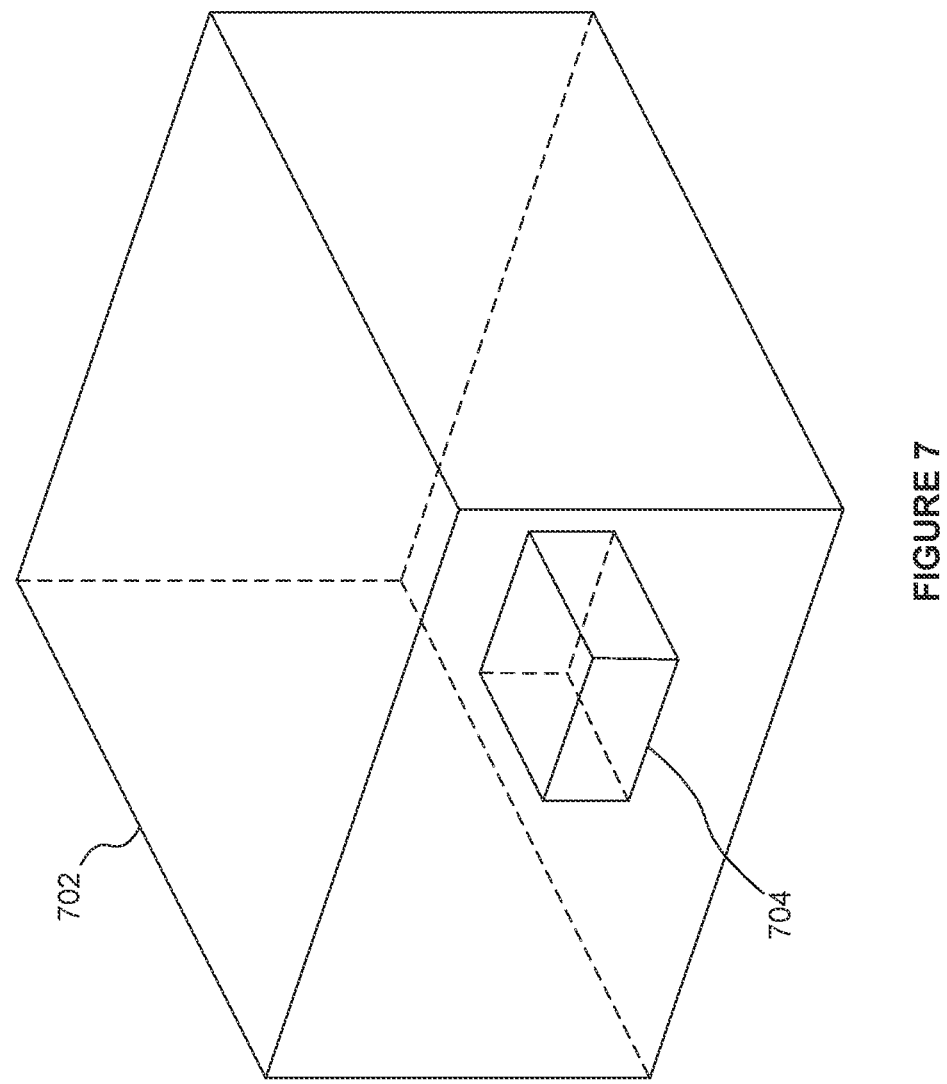
FIG. 7 illustrates a region of interest within a scene.

FIG. 7 shows an example of a region of interest 704 (or "sub-region", or "portion of interest") within a scene 702. As an example, the scene may correspond to a whole city in which a character of a game is currently located, whereas the region of interest 704 may correspond to the building within the city in which the character is currently located. In some examples, the region of interest 704 may correspond to a subset of the scene defined in terms of a view space (or clip space or screen space), wherein the subset of the scene may represent the portion of the scene which is located within a view frustum for the viewpoint from which a view of the scene is to be rendered. In some examples, the acceleration structure building logic 422 determines the region of interest for a frame based on the viewpoint from which the scene is to be rendered for the frame. In other words, the acceleration structure building logic 422 uses an indication of the viewpoint from which the scene is to be rendered to determine which parts of the scene lie within the view frustum. A reduced acceleration structure can be generated to represent only the geometry which is located within the sub-region 704. It can be appreciated from FIG. 7 that the sub-region 704 can be significantly smaller than the scene 702. Therefore, a reduced acceleration structure representing the sub-region 704 can be significantly smaller (in terms of the amount of data used to represent the acceleration structure and in terms of the number of nodes within the acceleration structure) than a world space acceleration structure representing the whole scene 702.

Figure 10:
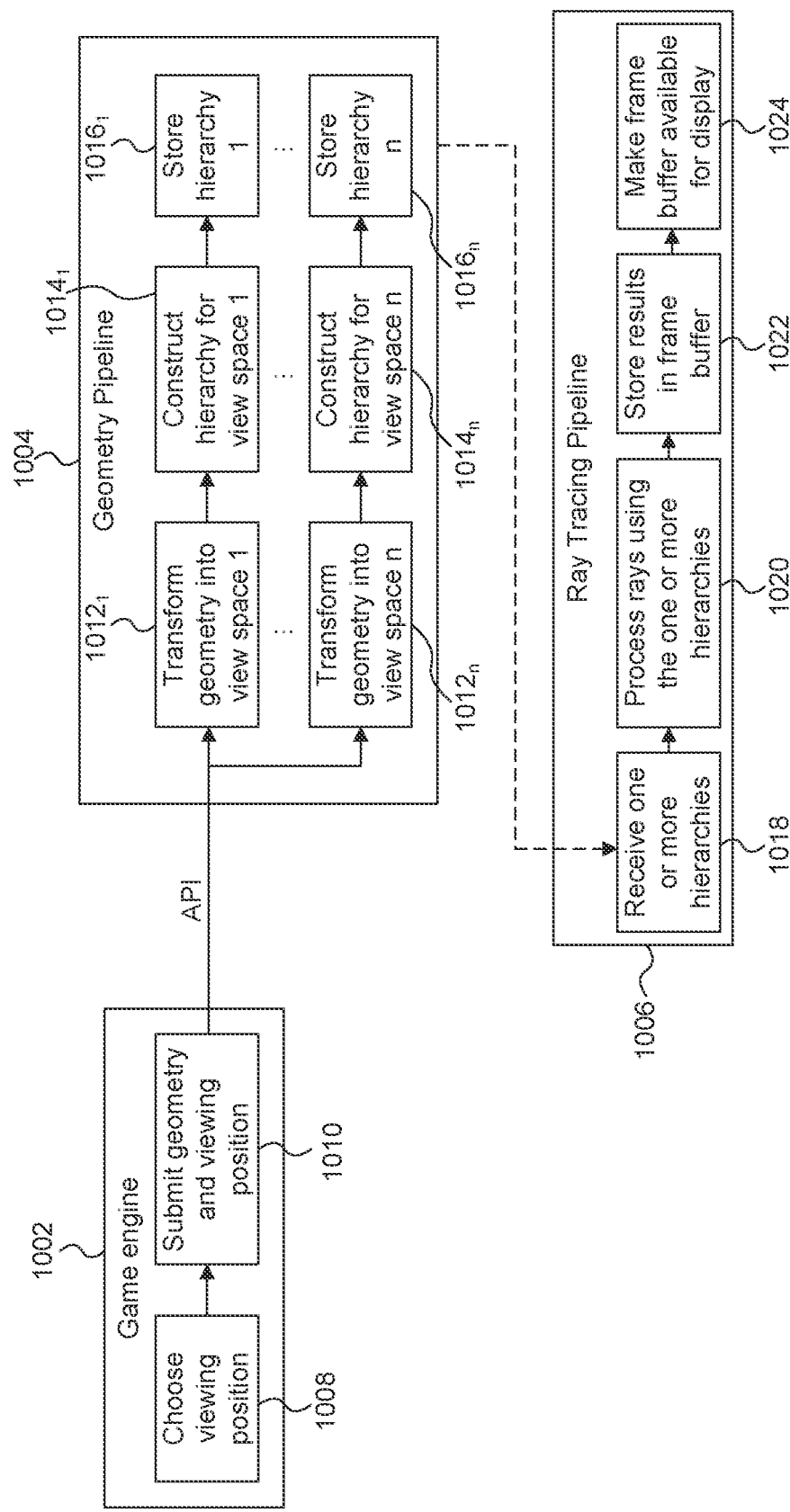
FIG. 10 shows interactions between a game engine, a geometry pipeline and a ray tracing pipeline.

In some examples, the application which submits geometry data to be rendered (e.g. a game application) can also define the view space (or region of interest) for which an acceleration structure is to be generated. In these examples, the acceleration structure building logic 422 may receive an indication of the viewpoint (i.e. the view space) via an Application Programming Interface (API). FIG. 10 illustrates the interactions between a game engine 1002, a geometry pipeline 1004 and a ray tracing pipeline 1006. At 1008 the game engine chooses a viewing position from which a scene is to be rendered. At 1010 the game engine submits the geometry and the viewing position to the geometry pipeline 1004, via an API. The data that is submitted for rendering a current frame includes the data needed to define the visible geometry and lighting effects for the visible geometry for the current frame, rendered from a current viewpoint. It may be possible to reuse some data from a previously rendered frame (e.g. for static data over a sequence of frames), and such data might not need to be resubmitted for the current frame. Therefore, the data that is submitted may depend on what has been submitted previously, e.g. can any of the previously submitted data be reused for the current render. For example, the shadows in a rendered frame might change for a directional light as the viewpoint for rendering the scene changes because the geometry being shadowed changes with the viewpoint. However, in some cases, the shadows might not change as the viewpoint changes if enough geometry was included in the shadow hierarchy generated for a previous frame, e.g. if all of the geometry visible with the current viewpoint was already included in the shadow hierarchy. In another example, the geometry pipeline may build a hierarchy from the primary viewpoint at a reduced rate from the full frame rate. In this embodiment, the hierarchy for the viewpoint may update regularly at 30 updates per second, while the ray tracing pipeline may render frames at 120 frames per second. Or alternatively the hierarchy may be regenerated when the viewpoint has substantially deviated from the viewpoint from which the last hierarchy was built.

The geometry pipeline 1004 can generate a number (n) of hierarchies, where n≥1. As described herein, a "hierarchy" is a processed version of the scene geometry which can be referenced by future rendering operations. A hierarchy may reference the original geometry data or be a processed copy of the geometry data or a subset of the geometry data. At $1012_1$ the geometry is transformed into a first view space ("view space 1"). The first view space may correspond to a camera view of the scene. At $1014_1$ a first reduced hierarchy is constructed for view space 1. At $1016_1$ the first reduced hierarchy ("hierarchy 1") is stored (e.g. in the acceleration structure data store 412 shown in FIG. 4). The processes of transforming the geometry into a view space ($1012_n$), constructing a reduced hierarchy ($1014_n$) and storing the $n^{th}$ hierarchy ($1016_n$) are performed for each of the n hierarchies.

FIG. 10 shows a ray tracing pipeline 1006 which can operate in parallel with the geometry pipeline 1004. There is a data dependency (which may be expressed with a memory fence in an API) as the ray tracing pipeline 1006 uses a hierarchy constructed by the geometry pipeline 1004, but rendering for one part of the scene, or a previous frame, can be performed by the ray tracing pipeline 1006 concurrently (i.e. in parallel) with the geometry pipeline 1004 processing another frame or part of the scene. The one or more hierarchies (which may include one or more reduced hierarchies) are made available to the ray tracing pipeline. The ray tracing pipeline operates asynchronously with the geometry pipeline. The ray tracing pipeline may render a frame using one or more hierarchies constructed in prior operations. Alternatively, the geometry pipeline may process multiple hierarchies to generate the prerequisite data for one operation of the ray tracing pipeline. At 1018, the ray tracing pipeline receives one or more hierarchies from the store (e.g. from the acceleration structure data store 412 shown in FIG. 4). At 1020 rays are processed using the one or more received hierarchies. For example, intersection testing of the rays can be performed against the received hierarchies, and shader programs can be executed based on the results of the intersection testing. At 1022 the results are stored in a frame buffer (e.g. output buffer 418 shown in FIG. 4). At 1024 the frame buffer is made available for display.

The different steps of the pipelines shown in FIG. 10 can be implemented in different functional components within a ray tracing system. For example, the geometry transformation (1012) may be implemented by a vertex transformation module, which could be implemented in dedicated fixed-function hardware or in software executed in a processing unit. Steps 1014, 1018 and 1020 may be implemented by a ray tracing unit (such as ray tracing unit 402 shown in FIG. 4) in dedicated hardware modules, software modules, or a combination thereof.

The different hierarchies are created for different purposes (e.g. with different view spaces), and the rendering operation of the ray tracing pipeline 1006 can make use of several hierarchies in the course of rendering the final output. For example, a shader program executing on a result of an intersection in one hierarchy may cause a ray to be emitted into another hierarchy to render a specific effect like a shadow or a reflection.

Some examples use an explicit API with separate entry points to generate hierarchies, and then make use of them. However, some other examples allow for an immediate mode API that emulates a single pipeline. In this way, the ray tracing pipeline could be exposed through an immediate mode API. A driver would hide the intermediate hierarchies that are created.

Figure 6:
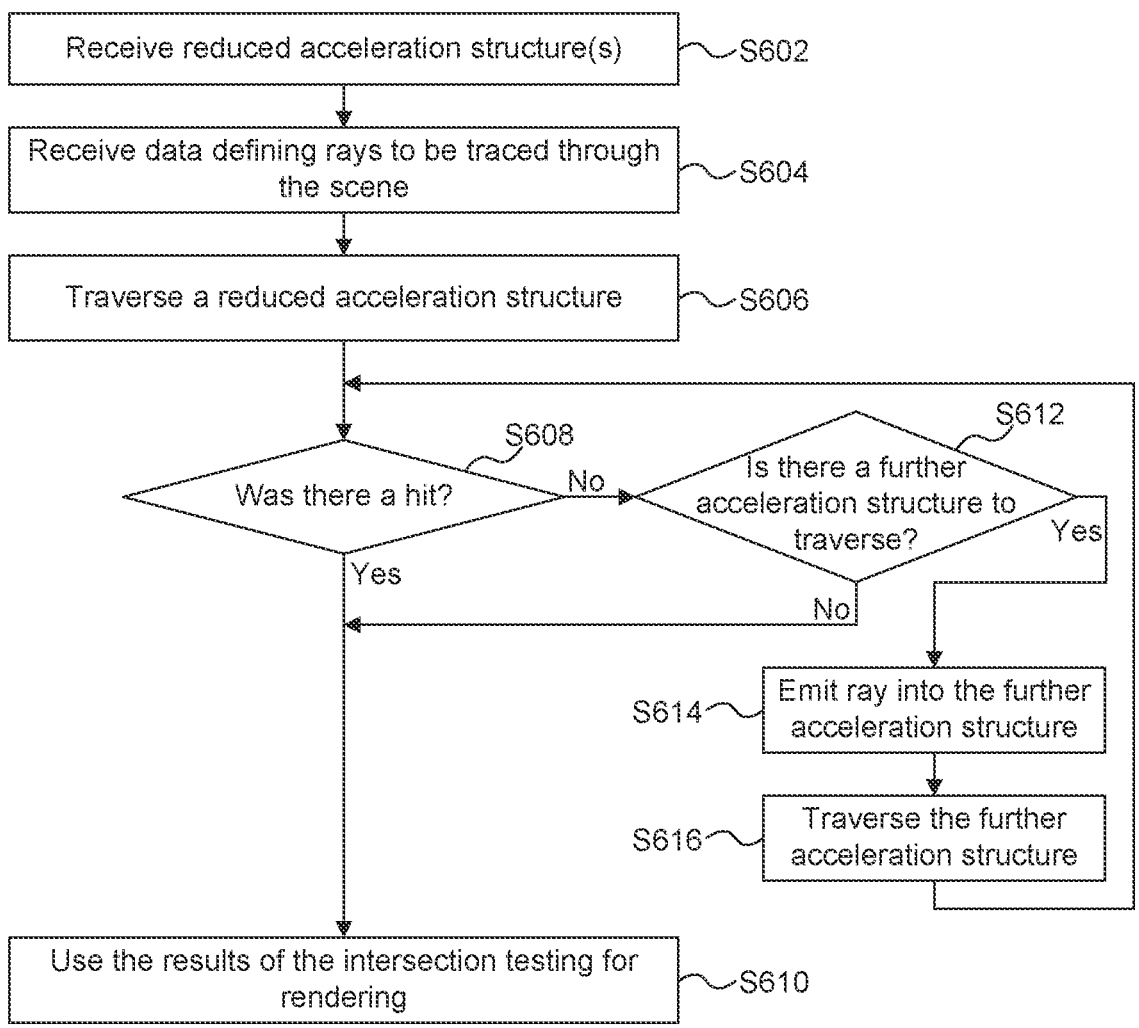
FIG. 6 is a flow chart for a method of performing intersection testing in a ray tracing system.

FIG. 6 is a flow chart for a method of performing intersection testing in the ray tracing system 400. In step S602 the intersection testing logic 406 receives, from the acceleration structure store 412, the reduced acceleration structure(s) representing the geometry in the respective subset(s) of the scene. The intersection testing logic 406 may, or may not, also receive a world space acceleration structure representing the geometry in the entire scene. The intersection testing logic 406 may also receive the geometry data (e.g. primitive data) from the scene geometry data store 410. In step S604 the intersection testing logic 406 receives data defining rays to be tested against the acceleration structure(s). The ray data may be received from the ray data store 414. The ray data can be stored in a ray cache within the intersection testing logic 406 so that it can be used more than once without needing to fetch the data from the store 414 each time it is used.

In step S606 the intersection testing logic 406 traverses a reduced acceleration structure, thereby performing intersection testing on rays against the geometry in the subset of the scene represented by the reduced acceleration structure. Methods are known in the art for testing whether a ray intersects with a volume (e.g. an axis-aligned bounding box) represented by a node in the hierarchy. As described above, the traversal could be implemented according to any suitable technique, such as a depth-first traversal technique or a breadth-first traversal technique. The nodes may be depth-sorted in terms of the "depth" (i.e. distance from a camera viewpoint) of the regions represented by the nodes, such that in a depth-first traversal technique (where now "depth" refers to the tree-space topology) nodes corresponding to nearer regions in a scene are tested before nodes corresponding to more distant regions in the scene. In this way, if an intersection is found with a relatively near primitive then intersection tests for more distant primitives can be skipped.

The results of intersection testing performed by the intersection testing logic 506 indicate, for each ray tested, whether an intersection has been found in the scene (i.e. a "hit" or a "miss"), and if a hit has been found then the results may indicate which primitive has been intersected (e.g. usually the closest of the intersected primitives where the ray has intersected more than one primitive). The results may also indicate a position of the intersection within the intersected primitive (e.g. using barycentric coordinates). In step S608 the intersection testing logic 406 determines whether a hit was found for a ray during the traversal of the reduced acceleration structure in step S606. If a hit was found then the method passes to step S610.

Results of the intersection testing can be passed to the processing logic 408. In step S610, the processing logic 408 uses the intersection testing results, e.g. for rendering an image of the 3D scene. For example, the processing logic 408 includes execution units for executing shader programs. The shader programs may be retrieved from the shader program store 416. The results of executing the shader programs at the processing logic 408 may be rendered pixel values of the image being rendered, and in this case the rendered pixel values can be provided to the output buffer 418 for storage therein. As described above, the execution of a shader program may emit one or more rays (secondary rays) into the scene which are passed back to the intersection testing logic 406 for intersection testing.

If, in step S608, a hit was not found for a ray during the traversal of the reduced acceleration structure in step S606 then the method passes to step S612. In step S612 the intersection testing logic 406 determines whether there is a further acceleration structure to traverse for the ray, i.e. an acceleration structure which has not already been traversed for the ray. If there are no further acceleration structures to be traversed for the ray then the method passes to step S610, in which the processing logic 408 uses the "miss" result for the ray accordingly, e.g. for rendering an image of the 3D scene. In some examples, when a miss result is encountered, a "miss shader program" can be executed in step S610. A miss shader program can be programmed to have any suitable functionality for processing a miss result, and may cause a further ray to be re-emitted into the same hierarchy from which the miss result was obtained or into a different hierarchy for further intersection testing.

If, in step S612, it is determined that there is a further acceleration structure to be traversed for the ray then the method passes to step S614. In step S614 the ray is emitted into the further acceleration structure. The further acceleration structure may, for example, be a world space acceleration structure representing the entire 3D scene. In some examples, the further acceleration structure may be another reduced acceleration structure representing a subset of the 3D scene. For example, the first reduced acceleration structure to be traversed may represent a relatively small subset of the 3D scene and then the second reduced acceleration structure may represent a relatively large subset of the 3D scene.

In step S616 the intersection testing logic 406 traverses the further acceleration structure. The traversal of the further acceleration structure in step S616 is similar to the traversal of the reduced acceleration structure in step S606. As such, any suitable traversal technique may be used, e.g. a depth-first traversal technique or a breadth-first traversal technique.

The method passes from step S616 to step S608 which is described above.

In some examples, more than one reduced acceleration structure is generated, wherein each of the reduced acceleration structures represents a respective sub-region within the 3D scene. Each of the sub-regions does not include the whole 3D scene. The sub-regions represented by respective reduced acceleration structures may, or may not, overlap with each other.

Figure 11:
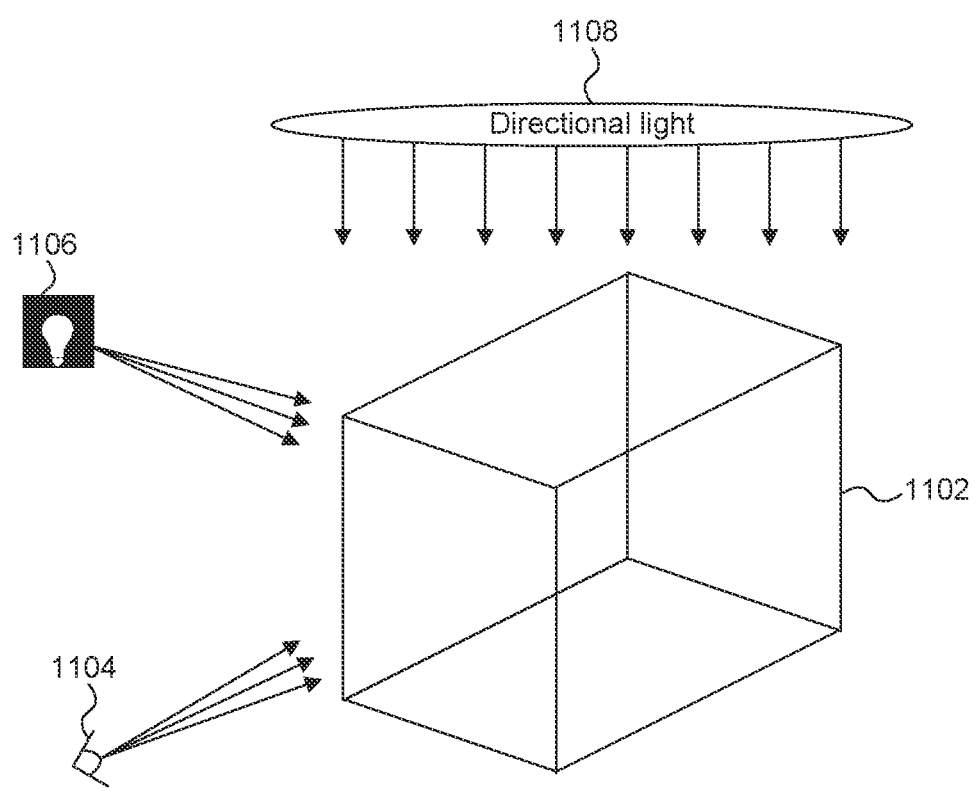
FIG. 11 illustrates a scene to be rendered from a view point, wherein the scene is lit by a point light source and a directional light source.

FIG. 11 illustrates a scene 1102 which is to be rendered from the viewpoint 1104. Objects in the scene are illuminated by a point light source 1106 (such as a light bulb), and by a directional light source 1108. Different reduced acceleration structures can be built for different purposes. For example, one reduced acceleration structure may be determined for the purposes of performing intersection testing on primary rays ("camera rays") which originate from the viewpoint 1104. A reduced acceleration structure for the camera rays can be determined as described above, e.g. based on the sub-region of the scene 1102 which lies within a view frustum for the viewpoint 1104. Furthermore, a reduced acceleration structure may be determined for shadow rays from a particular light source. For example, a perspective projection can be used to transform the geometry into a view space corresponding to the view of the scene from the point light source 1106. In this way, the reduced acceleration structure for the light source 1106 can represent the geometry in the scene within a view frustum from the point of view of the light source 1106. Furthermore, the generation of a reduced acceleration structure for a light source comprises performing one or both of clipping and culling operations on primitives in the scene from the point of view of the light source. For example, culling for face orientation (i.e. backface culling), frustum culling, clipping on near and far clipping planes, may be performed from the perspective of the light source. As another example, an orthographic projection can be used to transform the geometry into a view space corresponding to the view of the scene from the directional light source 1108. In this way, the reduced acceleration structure for the directional light source 1108 can represent the geometry in the scene within a view frustum from the point of view of the directional light source 1108. Similarly to as described above for the point light source, clipping and/or culling operations may be performed from the point of view of the directional light source 1108, e.g. culling for face orientation (i.e. backface culling), frustum culling, near and far clipping planes, etc. The reduced acceleration structures determined for the respective light sources 1106 and 1108 represent respective subsets of the scene 1102, such that they can be smaller than a world space acceleration structure representing the whole scene.

To render an image of the scene 1102 from the viewpoint 1104, primary rays are cast from the viewpoint 1104 and intersection testing is performed on the reduced acceleration structure corresponding to the viewpoint 1104. If an intersection is found then a shader program, is executed which may emit a shadow ray (or "occlusion ray"). Intersection testing can be performed on the shadow rays using each of the reduced acceleration structures determined for the respective light sources 1106 and 1108 in order to determine shadow effects resulting from each light source.

The different hierarchies can have different characteristics, such as different directional optimization, different subsets of primitives within the scene being included and different level of detail of the primitives represented by the hierarchies. Also, different hierarchies may have different formats. For example a direction-optimized hierarchy may be used for primary rays, while a bounding box hierarchy may be used for global illumination rays (e.g. from the directional light source 1108). A shader that runs in response to a ray intersection in one hierarchy may emit one or more rays (secondary rays, such as occlusion rays) into a different hierarchy.

In some examples, a respective reduced acceleration structure is generated for each of a plurality of areas of a rendering space in which the 3D scene is to be rendered. The rendering space is two dimensional. The areas of the rendering space may each individually be smaller than the entire rendering space, such that each of the reduced acceleration structures represents a sub-portion of the total view space. For example, the ray tracing system 400 may be implemented in a tile-based rendering system, and the areas of the rendering space may correspond to tiles of the tile-based rendering system.

Figure 8:
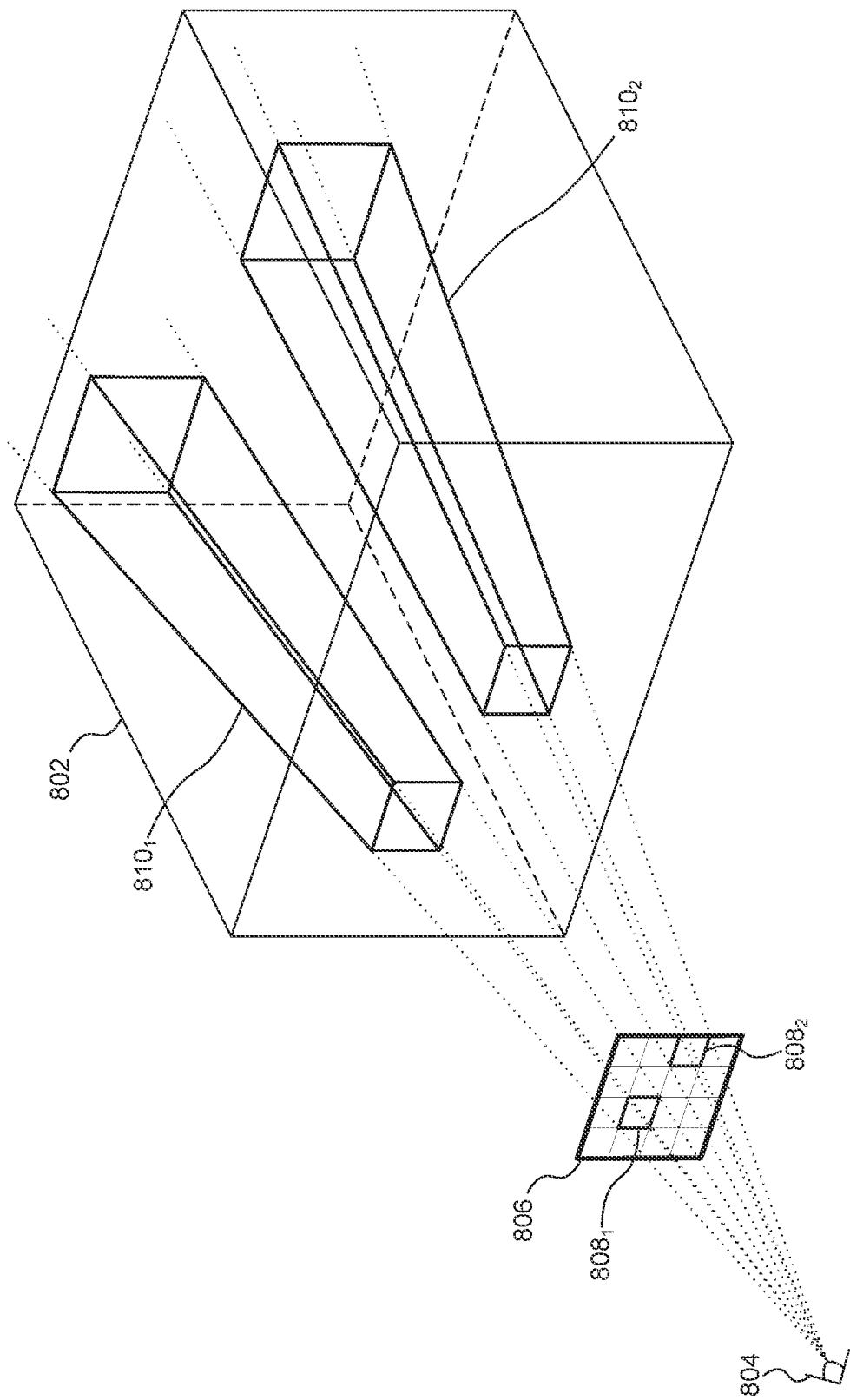
FIG. 8 illustrates two regions within a scene corresponding to two respective tiles of a rendering space.

FIG. 8 shows a different example in which a scene 802 is being viewed from the viewpoint 804. The rendering space into which the scene is being rendered (i.e. the view plane of the frame to be rendered) is represented at 806. The rendering space 806 is shown as being subdivided into a plurality of areas. Each of the areas may be a tile of the rendering space 806. However, in some examples, the mapping between areas and tiles of the rendering space might not be exactly one to one. For example, each area may correspond to more than one tile of the rendering space. In the example shown in FIG. 8 the rendering space is subdivided into sixteen areas arranged in a 4×4 pattern, with two of the areas being labelled as $808_1$ and $808_2$. A reduced acceleration structure can be generated for each of the areas 808 of the rendering space 806. The subset of the 3D scene 802 represented by a particular reduced acceleration structure, which is generated for a particular area of the rendering space 806, corresponds to a sub-region of the scene 802 which maps onto the respective particular area of the rendering space 806. For example, the frustum $810_1$ can be mapped onto the area $808_1$; and the frustum $810_2$ maps onto the area $808_2$. In other words, primary rays for sample positions (e.g. pixel positions) within the area $808_1$ will travel within the frustum $810_1$ of the scene 802. Primary rays for sample positions (e.g. pixel positions) within the area $808_2$ will travel within the frustum $810_2$ of the scene 802. Therefore, the reduced acceleration structure for an area (e.g. $808_1$) of the rendering space 806 provides a list of geometry that intersects the view frustum (e.g. $810_1$) of the area (e.g. $808_1$). When processing the tile corresponding to area $808_1$ in the tile-based rendering system the reduced acceleration structure for the tile provides a small data structure to be traversed for the intersection testing performed on primary rays in the tile. This allows primary rays to be processed very efficiently using a reduced acceleration structure which is optimised for each particular tile. However, secondary rays may travel outside of the frustum for a tile (e.g. outside of frustum $810_1$ for tile $808_1$). Therefore the likelihood is relatively high that secondary rays miss in the reduced acceleration structure for a tile compared to the likelihood that primary rays miss in the reduced acceleration structure for the tile. Therefore, the result of step S608 being "No" is more likely for secondary rays than for primary rays, such that secondary rays are more likely to be emitted into a further acceleration structure. For example, there may be a view space (or screen space) acceleration structure which is a reduced acceleration structure representing the subset of the scene in the view space (or screen space), and this may be the first further acceleration structure into which a ray may be emitted if there is a miss in the reduced acceleration structure for a tile. As another example, there may be a world space acceleration structure representing the entire scene, and this may be the final further acceleration structure into which a ray may be emitted if there is a miss in a reduced acceleration structure. There may be one or more levels of further acceleration structures, which can be thought of as forming a hierarchy at different scales, e.g. at one or more of a tile scale, a view scale and the full scene scale. In some examples, a primary ray may be processed by first traversing (in step S606) a reduced acceleration structure corresponding the relevant tile of the rendering space for the primary ray, but a secondary ray may be processed by first traversing (in step S606) a different acceleration structure, e.g. a reduced acceleration structure corresponding the view space or a world space acceleration structure.

As described herein, an acceleration structure is an index structure that speeds up the search for primitives, e.g. for intersection testing in a ray tracing system. A directionally optimized acceleration structure is very well optimized for searching for primitives for intersection with rays from a coherent or nearly coherent projection. For example, the geometry within a directionally optimized acceleration structure may be organized or partitioned such that fewer coarse-granularity tests of the acceleration structure are necessary for rays aligned with the hierarchy's optimized projection. These optimizations may reduce efficiency for rays that have a substantially different direction or orientation from the optimized direction or orientation. Directionally optimized acceleration structures are ideal for camera rays (i.e. eye rays), where the majority of rays are originating from the same viewpoint. This is also ideal for rays that converge on a point or converging near an area of the scene, like would be needed to test shadow rays against a light source. Furthermore, using an orthographic projection to create an acceleration structure is very useful for testing rays that all have a very similar direction, like for a shadow from a directional light source such as the sun or a set of coherent specular reflections.

In other words, a hierarchy may be constructed, or optimised, for an orientation of interest. The same primitives may still present, but the hierarchy is optimized for faster traversal in the orientation of interest. The hierarchy does not always contain the same primitives as a hierarchy which has not been optimised for an orientation of interest because of backface culling, where the back face is defined by the orientation, or "virtual viewpoint", focus point or convergence point.

In some situations, rays may be nearly coherent, but not necessarily 100% coherent. This might happen if rays were emitted by a shader operation, rather than a regular sampling pattern. For example, a camera shader implementing a thin-lens model for a Depth-of-field effect. Rays might vary both in origin and direction, slightly, but on the whole the rays would be mostly coherent. Therefore, in an example where respective frusta are defined for different tiles of a rendering space (e.g. as shown in FIG. 8), in some examples rays might not be perfectly aligned with the frusta for the tiles. This situation can be handled according to different solutions.

The term "coherent" may refer to a similar direction, but also to a similar origin and a predictable spread from that origin, e.g. for rays from a camera, or rays converging on a point light. Furthermore, "coherent" might mean "memory coherent", wherein rays emitted near to one another might originate and terminate in the same rough region of space, even if their directions were totally random. It is noted that "coherent" is a comparative concept, for example rays traveling mostly the same direction are more coherent than random rays, but rays that share the same direction are more coherent still.

In a first solution, a ray is allowed to migrate between different (e.g. adjacent) frusta. If a ray begins in one frustum, but reaches the edge of the frustum (due to the slight discrepancies between the ray directions and the edges of the frusta) without finding a primitive hit, then it can be tested in an adjacent frustum. In order to test the ray in the adjacent frustum, the ray may be re-emitted into the acceleration structure corresponding to that adjacent frustum.

In a second solution, frusta are allowed to have overlapping boundaries, such that the maximum ray divergence means that any ray will be able to intersection test the scene by traversing the acceleration structure for a single frustum. This approach requires the ray divergence to be limited to a fixed maximum amount. In some examples, a multi-ray format may be used such that a plurality of rays can be grouped together into a ray bundle, whereby intersection testing is performed on the rays of the ray bundle. Shader programs can be executed on the rays in the ray bundle, wherein the execution of a shader program may comprise determining differential data for a particular ray of the ray bundle using data for another ray of the ray bundle. Methods for processing rays in ray bundles are described in more detail in U.S. patent application Ser. No. 15/458,110.

A reduced acceleration structure may have a different resolution compared to the resolution of a world space acceleration structure. For example, a reduced acceleration structure may represent primitives having a greater resolution, i.e. a greater Level Of Detail (LOD), than primitives represented by a world space acceleration structure. This means that the amount of data used to store the world space acceleration structure is less than if an acceleration structure was stored for the whole scene at the resolution at which the reduced acceleration structure is generated. This means that the LOD of the reduced acceleration structure (corresponding to the region of the scene in which intersections are most likely to occur) can be relatively high, without increasing the memory storage requirement or bandwidth requirements by as much as if the whole scene were represented with an acceleration structure at the same, relatively high, LOD.

In examples described herein, the reduced acceleration structure(s) are generated dynamically for each render of the 3D scene. In this way, as the view port changes (e.g. as viewpoint 804 changes) from frame to frame, and as dynamic geometry is supplied for each frame, the reduced acceleration structure(s) is(are) updated or re-generated. The processing involved in dynamically generating a world space acceleration structure for each render tends to be too large to be justifiable for real-time rendering. However, since the reduced acceleration structures represent only a subset of the entire scene (and the subset is often much smaller than the entire scene) the processing burden involved in generating the reduced acceleration structure(s) dynamically for each render is not expected to be overwhelming large.

The nodes of the reduced acceleration structure(s) may be determined based on the viewing direction from which the 3D scene is to be rendered, so as to improve the efficiency of the reduced acceleration structure(s), e.g. so as to improve the efficiency with which the reduced acceleration structure(s) is(are) traversed during intersection testing, or so as to improve the efficiency in terms of the amount of data used to represent the reduced acceleration structure(s). For example, nodes of a reduced acceleration structure may have a shape which is elongated in a direction approximately aligned with the viewing direction. For example, if the viewing direction is such that the rays travel in a direction which generally corresponds to one of the x, y or z axes, then the nodes of the reduced acceleration structure can be formed as an AABB which is elongated along said one of the axes. When an acceleration structure is used to perform intersection testing on rays which all have a similar ray direction, the efficiency of the intersection testing can be increased by having nodes in the acceleration structure which are elongated in a direction which is the same as, or similar to, the direction of the rays. Since all of the primary rays to be tested have a similar direction, it can be beneficial to the efficiency of the intersection testing for the reduced acceleration structure(s) to have nodes which are elongated in a direction approximately matching the ray directions. The efficiency gains are less pronounced for secondary rays because the directions of secondary rays can vary much more than the directions of primary rays. Furthermore, elongating the nodes may make each individual node larger than if the nodes were not elongated, which can lead to fewer nodes being included in the acceleration structure, such that the amount of data used to represent the acceleration structure is reduced (compared to not using elongated nodes). Therefore, it could be useful to build reduced acceleration structures corresponding to tiles of the rendering space with nodes which are elongated in a direction along, or close to, the primary ray direction (because these may be the reduced acceleration structures that primary rays will be tested against); but in some examples a reduced acceleration structure may be built with nodes which are not preferentially elongated in any particular direction (because this may be the reduced acceleration structure that secondary rays will be tested against). There may be other aspects of the way in which the nodes of a reduced acceleration structure are generated (besides the elongated shape of the nodes) which are determined so as to improve the efficiency of the reduced acceleration structure(s).

In some examples, to reduce the processing cost incurred in dynamically generating the reduced acceleration structure(s) for each render, the acceleration structure building logic 422 may generate a static world space acceleration structure for the 3D scene. The world space acceleration structure is "static" in the sense that it is not re-generated for each render. The static world space acceleration structure can be reduced (i.e. nodes can be removed) to form a reduced acceleration structure (e.g. corresponding to the view space within the scene). The removal (or "culling") of nodes from the world space acceleration structure may be performed by analysing the nodes of the world space acceleration structure and deciding whether each parent node is in the view space, wherein if a parent node is not in the view space then that node and all nodes descending from it are culled. The reduced acceleration structure can be updated with changes to the content within the scene that occur from render to render, such that the reduced acceleration structure correctly represents the static geometry and the dynamic geometry within the scene. As explained above separate acceleration structures may be generated for respective dynamic objects, and the acceleration structures for dynamic objects can be merged with the acceleration structure for the static geometry from the previous frame in order to generate a merged acceleration structure for the current render. An explanation of the way in which separate acceleration structures can be merged together can be found in U.S. patent application Ser. No. 15/464,729. In some examples, the hierarchy from which nodes are culled to form a reduced acceleration structure may be an acceleration structure other than a world space acceleration structure, e.g. it may be an acceleration structure which does not represent the entire 3D scene, but which does represent a larger portion of the 3D scene than the portion represented by the reduced acceleration structure.

Figure 3A:
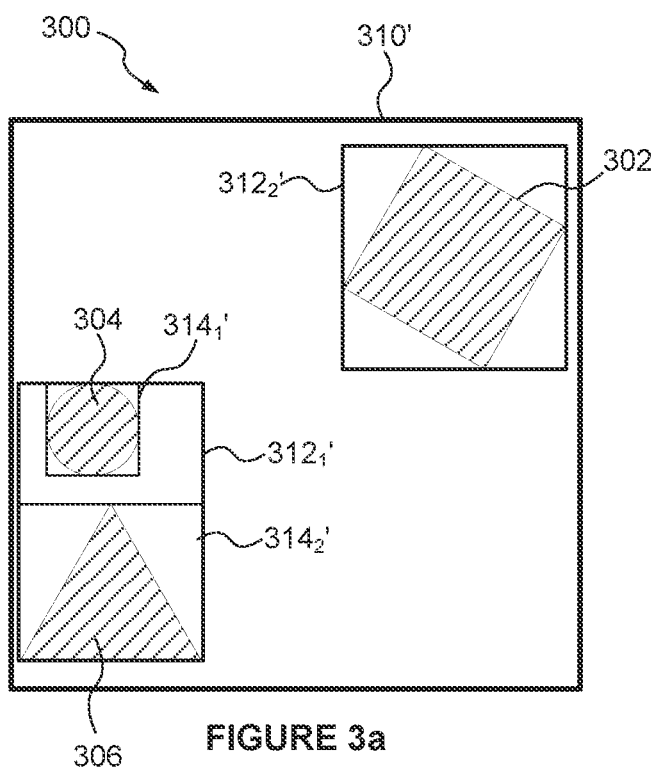
FIG. 3a shows a scene divided according to a bounding volume structure.
Figure 3B:
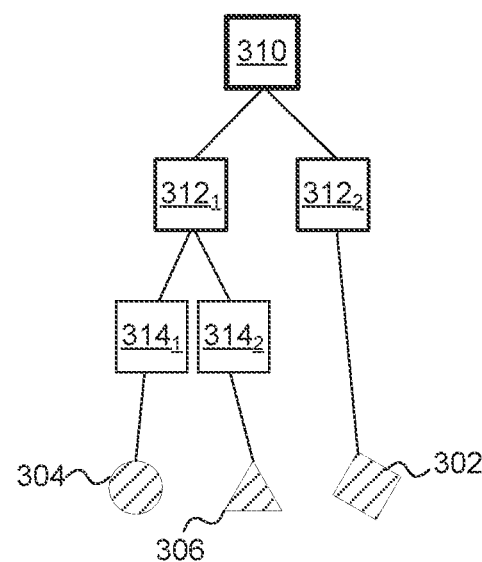
Figure 9A:
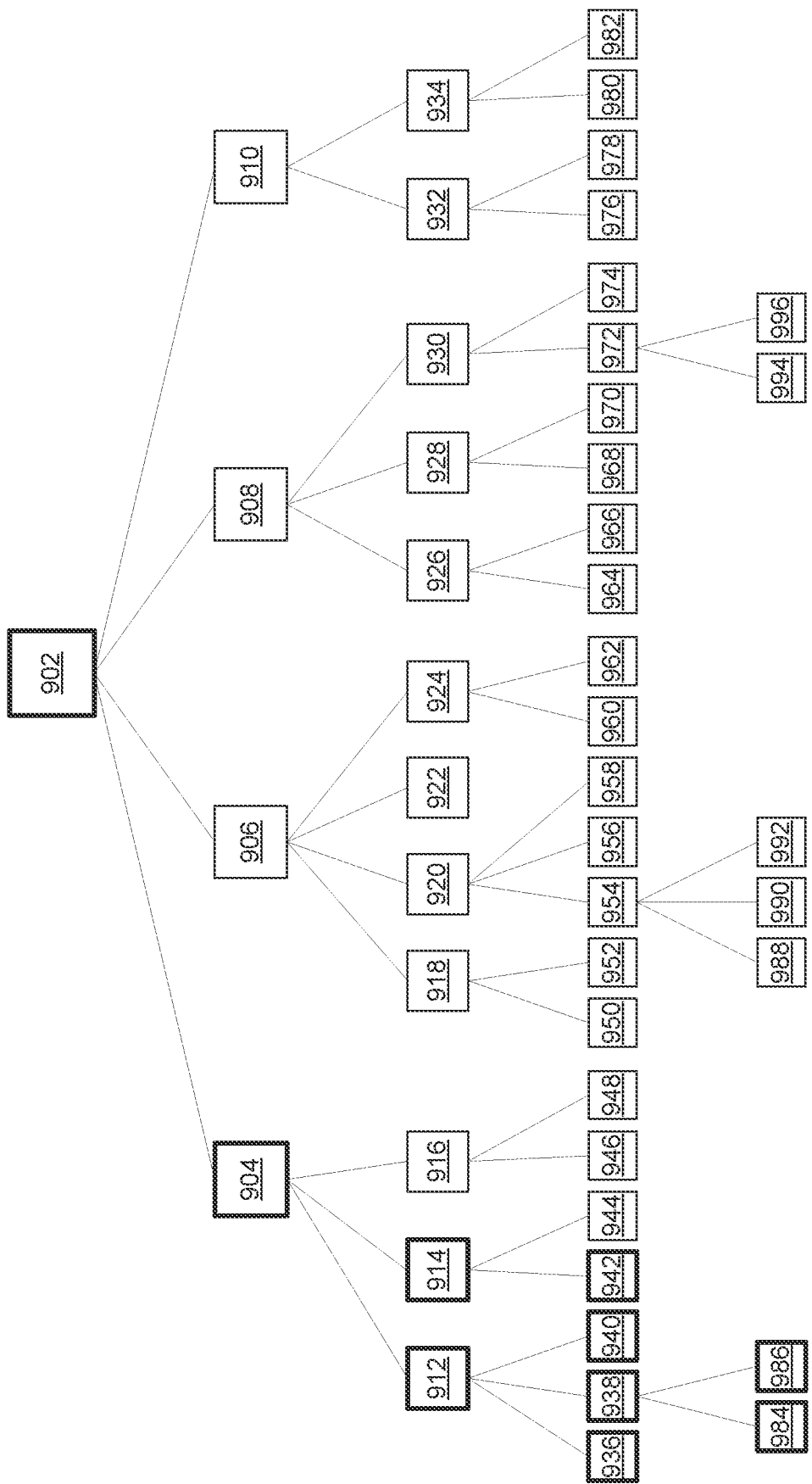
FIG. 9a illustrates nodes of a world space hierarchy.
Figure 9B:
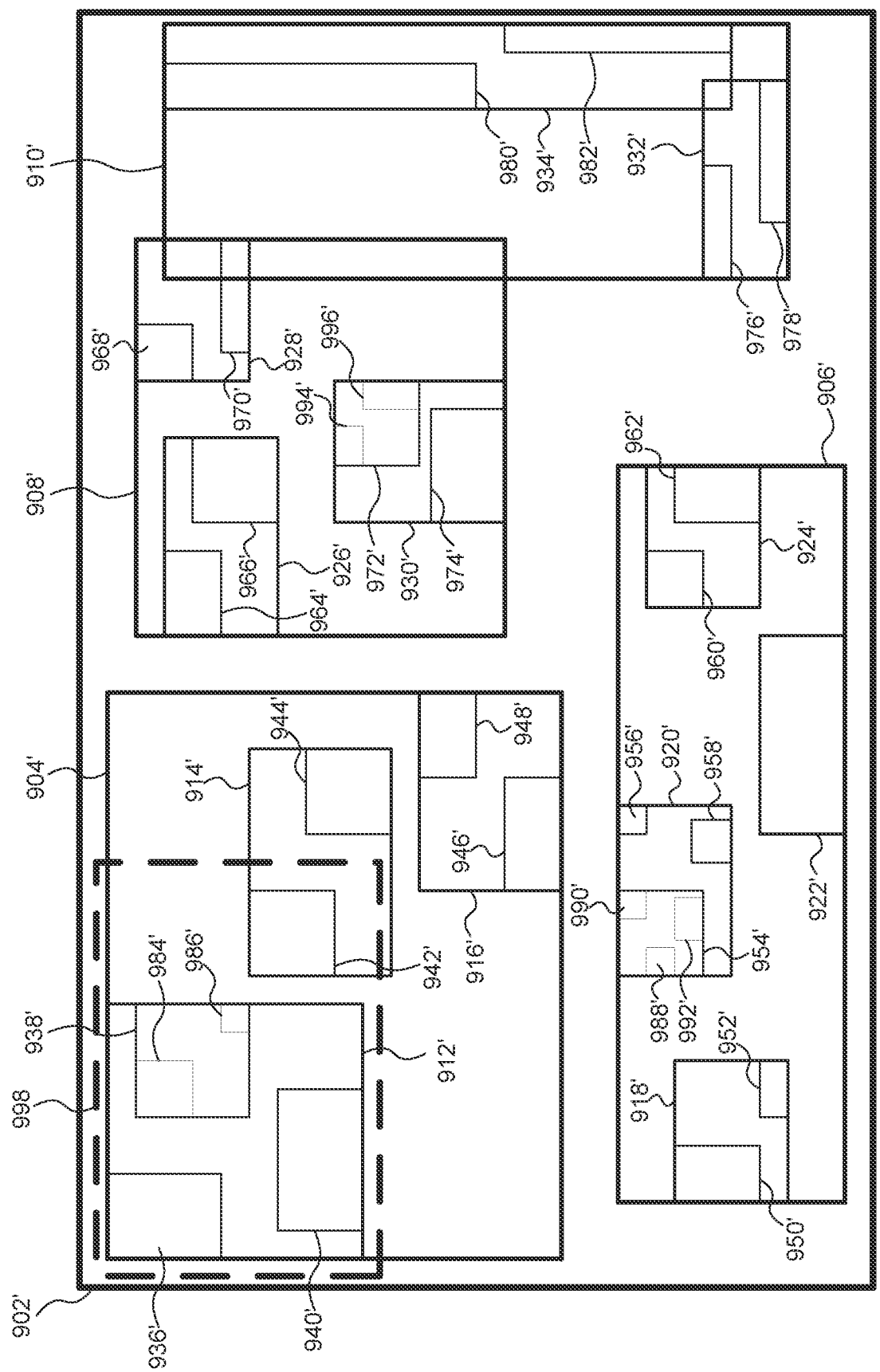

FIG. 9a illustrates nodes of a world space hierarchy representing a whole 3D scene which has been generated by the acceleration structure building logic 422 in an example. FIG. 9b illustrates volumetric elements within the scene corresponding to the nodes of the world space acceleration structure shown in FIG. 9a. The notation used in FIGS. 9a and 9b is similar to that used in FIGS. 3a and 3b in that regions in the scene shown in FIG. 9b have references matching those of the corresponding nodes in the hierarchy shown in FIG. 9a, but the references for the regions in FIG. 9b include an additional prime symbol ('). It is noted that, for clarity, FIG. 9b is a 2D representation of the scene, but it would be apparent to one skilled in the art that the scene could be a 3D scene.

The root node 902 corresponds to the whole volume of the scene to be rendered 902'. The example acceleration structure shown in FIGS. 9a and 9b has a bounding volume structure where the nodes correspond to axis-aligned bounding boxes (AABBs) in the scene. There are four nodes (904 to 910) in the first level below the root node 902, which descend from the root node 902, and these four nodes correspond respectively to the regions 904' to 910' shown in FIG. 9b. There are twelve nodes (912 to 934) in the second level below the root node, and these nodes correspond respectively to the regions 912' to 934' shown in FIG. 9b. There are twenty four nodes (936 to 982) in the third level below the root node, and these nodes correspond respectively to the regions 936' to 982' shown in FIG. 9b. There are seven nodes (984 to 996) in the fourth level below the root node, and these nodes correspond respectively to the regions 984' to 996' shown in FIG. 9b. In particular, three nodes (912 to 916) descend from node 904, and these three nodes correspond to the AABBs 912' to 916' shown in FIG. 9b. Three nodes (936 to 940) descend from node 912, and these three nodes correspond to the AABBs 936' to 940' shown in FIG. 9b. Two nodes (984 and 986) descend from node 938, and these two nodes correspond to the AABBs 984' and 986' shown in FIG. 9b. Two nodes (942 and 944) descend from node 914, and these two nodes correspond to the AABBs 942' and 944' shown in FIG. 9b. Two nodes (946 and 948) descend from node 916, and these two nodes correspond to the AABBs 946' and 948' shown in FIG. 9b. Four nodes (918 to 924) descend from node 906, and these four nodes correspond to the AABBs 918' to 924' shown in FIG. 9b. Two nodes (950 and 952) descend from node 918, and these two nodes correspond to the AABBs 950' and 952' shown in FIG. 9b. Three nodes (954 to 958) descend from node 920, and these three nodes correspond to the AABBs 954' to 958' shown in FIG. 9b. Three nodes (988 to 992) descend from node 954, and these three nodes correspond to the AABBs 988' to 992' shown in FIG. 9b. Two nodes (960 and 962) descend from node 924, and these two nodes correspond to the AABBs 960' and 962' shown in FIG. 9b. Three nodes (926 to 930) descend from node 908, and these three nodes correspond to the AABBs 926' to 930' shown in FIG. 9b. Two nodes (964 and 966) descend from node 926, and these two nodes correspond to the AABBs 964' and 966' shown in FIG. 9b. Two nodes (968 and 970) descend from node 928, and these two nodes correspond to the AABBs 968' and 970' shown in FIG. 9b. Two nodes (972 and 974) descend from node 930, and these two nodes correspond to the AABBs 972' and 974' shown in FIG. 9b. Two nodes (994 and 996) descend from node 972, and these two nodes correspond to the AABBs 994' and 996' shown in FIG. 9b. Two nodes (932 and 934) descend from node 910, and these two nodes correspond to the AABBs 932' and 934' shown in FIG. 9b. Two nodes (976 and 978) descend from node 932, and these two nodes correspond to the AABBs 976' and 978' shown in FIG. 9b. Two nodes (980 and 982) descend from node 934, and these two nodes correspond to the AABBs 980' and 982' shown in FIG. 9b.

The dashed box 998 in FIG. 9*b* represents a sub-region of the scene corresponding to the view space (or other region of interest) within the scene. As described above, the sub-region 998 may be determined based on the viewpoint from which the scene is viewed. In this example, the acceleration structure building logic 422 determines the nodes of a reduced acceleration structure representing the sub-region 998 within the scene 902' by reducing the world space acceleration structure shown in FIG. 9*a* to focus on the sub-region 998. This can be done by culling nodes of the world space acceleration structure which correspond to regions in the scene which do not overlap with the sub-region 998. The nodes shown in bold in FIG. 9*a* (i.e. nodes 902, 904, 912, 914, 936, 938, 940, 942, 984 and 986) correspond to regions in the scene (i.e. AABBs 902', 904', 912', 914', 936', 938', 940', 942', 984' and 986') which overlap (at least partially) with the sub-region 998; whereas all the other nodes in the world space acceleration structure (i.e. the nodes in FIG. 9*a* which are not shown in bold) correspond to regions in the scene which do not overlap with (i.e. are not located at least partially within) the sub-region 998. Therefore a reduced acceleration structure for the sub-region 998 can be generated by culling, from the world space acceleration structure, the nodes which are not shown in bold in FIG. 9*a*.

Figure 9C:
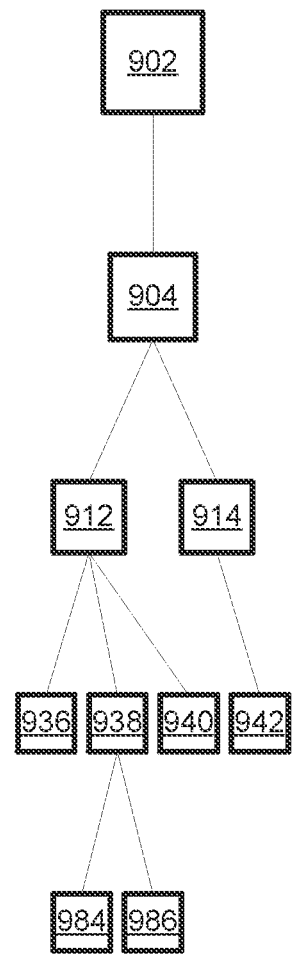

FIG. 9*c* shows the resulting reduced acceleration structure representing the sub-region 998. It can be appreciated by comparing FIGS. 9*a* and 9*c* that the reduced acceleration structure shown in FIG. 9*c* has fewer nodes, and that the amount of data used to represent the reduced acceleration structure shown in FIG. 9*c* will be less than the amount of data used to represent the world space acceleration structure shown in FIG. 9*a*. This means that the amount of memory space used to store the reduced acceleration structure is less than the amount of memory space that would be used to store the world space acceleration structure. Furthermore, the amount of data that is transferred between the ray tracing unit 402 and the acceleration structure store 412 (which may be referred to as the "memory bandwidth") is less when using the reduced acceleration structure as compared to the world space acceleration structure. As described above the acceleration structure store 412 may be implemented as system memory, wherein communication between the ray tracing unit 402 and the system memory may be via a communications bus. There may be a relatively high latency involved in transferring data over a communications bus, e.g. in a System On Chip (SOC), (compared to on-chip communications) so using the reduced acceleration structure (rather than a world space acceleration structure) can reduce the latency involved in the ray tracing process. Furthermore, when the intersection testing logic 406 performs intersection testing, the traversal of the reduced acceleration structure shown in FIG. 9*c* is faster than the traversal of the world space acceleration structure shown in FIG. 9*a*.

Figure 12:
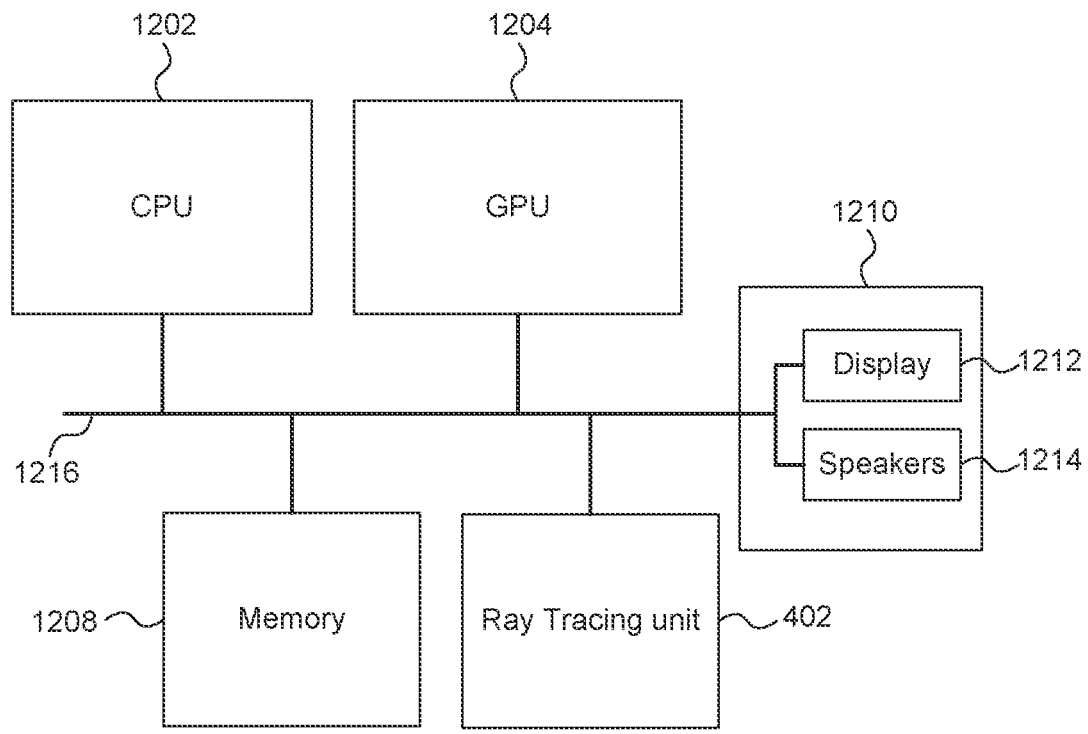
FIG. 12 shows a computer system in which a ray tracing unit is implemented.

FIG. 12 shows a computer system in which the ray tracing systems described herein may be implemented. The computer system comprises a CPU 1202, a GPU 1204, the ray tracing unit 402, a memory 1208 and other devices 1210, such as a display 1212 and speakers 1214. The components of the computer system can communicate with each other via a communications bus 1216. The data stores 410, 412, 414, 416 and 418 may be implemented as part of the memory 1208.

The ray tracing system 400 of FIG. 4 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing units described herein may be embodied in hardware on an integrated circuit. The ray tracing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing unit configured to perform any of the methods described herein, or to manufacture a ray tracing unit comprising any apparatus described herein. An integrated circuit definition dataset may be, for example, an integrated circuit description.

Therefore, there may be provided a method of manufacturing, at an integrated circuit manufacturing system, a ray tracing unit (or ray tracing system, or any component thereof) as described herein. Furthermore, there may be provided an integrated circuit definition dataset that, when processed in an integrated circuit manufacturing system, causes the method of manufacturing a ray tracing unit (or any component thereof, e.g. a processing module) to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing unit will now be described with respect to FIG. 13.

Figure 13:
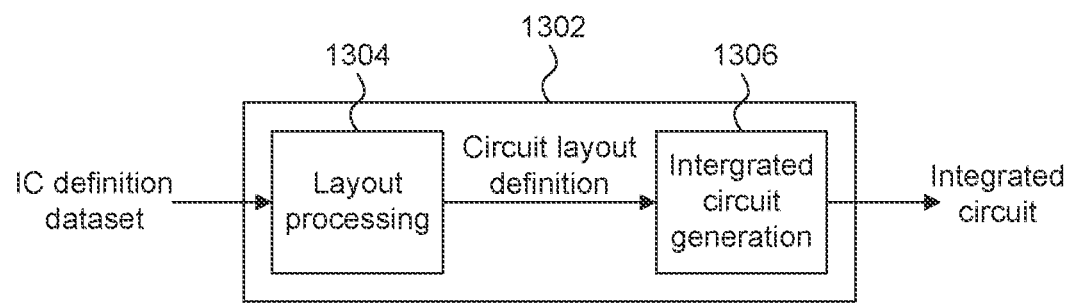
FIG. 13 shows an integrated circuit manufacturing system for generating an integrated circuit embodying a ray tracing unit or a processing module.

FIG. 13 shows an example of an integrated circuit (IC) manufacturing system 1302 which is configured to manufacture a ray tracing unit or processing module as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining a ray tracing unit or processing module as described in any of the examples herein), process the IC definition dataset, and generate an IC according to the IC definition dataset (e.g. which embodies a ray tracing unit or processing module as described in any of the examples herein). The processing of the IC definition dataset configures the IC manufacturing system 1302 to manufacture an integrated circuit embodying a ray tracing unit or processing module as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing unit or processing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A ray tracing unit for processing a 3D scene comprising:
    intersection testing logic configured to perform intersection testing by traversing a viewpoint-dependent reduced acceleration structure, wherein the intersection testing logic is configured to emit a ray into a further acceleration structure and traverse the further acceleration structure, if the traversal of the viewpoint-dependent reduced acceleration structure results in a miss for the ray, wherein the further acceleration structure is a hierarchical acceleration structure.

2. The ray tracing unit of claim 1, further comprising a processing module configured to:
    receive geometry for the 3D scene; and
    build the reduced acceleration structure using the received geometry.

3. The ray tracing unit of claim 2, wherein the processing module is configured to process the received geometry to determine relevant geometry to be included in the reduced acceleration structure by performing one or both of clipping and culling on the received geometry based on a viewpoint.

4. The ray tracing unit of claim 3, wherein said performing one or both of clipping and culling on the received geometry comprises clipping or culling geometry that is out of bounds when the scene is viewed from the viewpoint, so that only geometry which is present within the view of the scene from the viewpoint is maintained and included in the reduced acceleration structure.

5. The ray tracing unit of claim 3, wherein the processing module is further configured to process the received geometry to determine relevant geometry to be included in the reduced acceleration structure by performing backface culling based on the viewpoint such that backfacing primitives are culled.

6. The ray tracing unit of claim 1, wherein the reduced acceleration structure represents a sub-region within the 3D scene rather than representing the whole 3D scene.

7. The ray tracing unit of claim 1, wherein the reduced acceleration structure represents a relatively small subset of the 3D scene and the further acceleration structure represents a relatively large subset of the 3D scene.

8. The ray tracing unit of claim 1, wherein the further acceleration structure is another reduced acceleration structure or a world space acceleration structure.

9. The ray tracing unit of claim 1, further comprising processing logic configured to use results of said intersection testing for rendering an image of the 3D scene.

10. A computer-implemented method of performing intersection testing in a ray tracing system to process a 3D scene, wherein the method comprises:
    traversing a viewpoint-dependent reduced acceleration structure; and
    in response to the traversal of the viewpoint-dependent reduced acceleration structure resulting in a miss for the ray, emitting the ray into a further acceleration structure and traversing the further acceleration structure, wherein the further acceleration structure is a hierarchical acceleration structure.

11. The method of claim 10, further comprising:
    receiving geometry for the 3D scene; and
    building the reduced acceleration structure using the received geometry.

12. The method of claim 11, wherein said building the reduced acceleration structure comprises processing the received geometry to determine relevant geometry to be included in the reduced acceleration structure by performing one or both of clipping and culling on the received geometry based on a viewpoint.

13. The method of claim 11, wherein said building the reduced acceleration structure comprises culling nodes from a larger acceleration structure.

14. The method of claim 10, wherein the reduced acceleration structure represents a sub-region within the 3D scene rather than representing the whole 3D scene.

15. The method of claim 14, wherein the sub-region corresponds to a view frustum within the scene.

16. The method of claim 10, wherein nodes of the reduced acceleration structure are defined in a view space or a clip space, and wherein nodes of the reduced acceleration structure have shapes which are elongated in a direction approximately aligned with a viewing direction based on a viewpoint.

17. The method of claim 10, further comprising using results of said intersection testing for rendering an image of the 3D scene.

18. The method of claim 10, wherein the further acceleration structure is another reduced acceleration structure or a world space acceleration structure which represents the whole 3D scene.

19. The method of claim 18, wherein the one or more reduced acceleration structures represent primitives having a greater Level Of Detail than primitives represented by the world space acceleration structure.

20. A non-transitory computer readable storage medium having encoded thereon a computer readable description of an integrated circuit that, when processed in an integrated circuit manufacturing system, causes the integrated circuit manufacturing system to manufacture a ray tracing unit which is configured to process a 3D scene, wherein the ray tracing unit comprises:

intersection testing logic configured to perform intersection testing by traversing a viewpoint-dependent reduced acceleration structure, wherein the intersection testing logic is configured to emit a ray into a further acceleration structure and traverse the further acceleration structure, if the traversal of the viewpoint-dependent reduced acceleration structure results in a miss for the ray, wherein the further acceleration structure is a hierarchical acceleration structure.

* * * * *